US007924808B2

(12) United States Patent
Han et al.

(10) Patent No.: US 7,924,808 B2
(45) Date of Patent: Apr. 12, 2011

(54) METHOD OF TRANSMITTING SYNCHRONIZATION SIGNAL IN WIRELESS COMMUNICATION SYSTEM

(75) Inventors: Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/451,504

(22) PCT Filed: May 16, 2008

(86) PCT No.: PCT/KR2008/002763
§ 371 (c)(1), (2), (4) Date: Nov. 16, 2009

(87) PCT Pub. No.: WO2008/143443
PCT Pub. Date: Nov. 27, 2008

(65) Prior Publication Data

US 2010/0110873 A1 May 6, 2010

(30) Foreign Application Priority Data

May 17, 2007 (KR) ........................ 10-2007-0048353
Jun. 12, 2007 (KR) ........................ 10-2007-0057531
Jul. 6, 2007 (KR) ........................ 10-2007-0068364

(51) Int. Cl.
*H04J 3/06* (2006.01)

(52) U.S. Cl. ........................................ 370/350; 370/208

(58) Field of Classification Search .................. 370/349, 370/203, 208, 350, 509, 510, 511, 512, 513, 370/514
See application file for complete search history.

(56) References Cited

U.S. PATENT DOCUMENTS 6,480,558 B1 11/2002 Ottosson et al.
6,731,673 B1 5/2004 Kotov et al.
6,760,361 B2 7/2004 Nystrom et al.
6,922,388 B1 7/2005 Laroia et al.
(Continued)

FOREIGN PATENT DOCUMENTS

EP 1 643 660 4/2006
(Continued)

OTHER PUBLICATIONS

Jamil et al., "A Comparison of Unfiltered and Filtered Complex Spreading Sequences Based on Aperiodic Correlation Properties", XP010307631, Downloaded on Feb. 9, 2010.

*Primary Examiner* — Brenda Pham
(74) *Attorney, Agent, or Firm* — McKenna Long & Aldridge LLP

(57) ABSTRACT

A method of transmitting a synchronization signal includes generating a sequence P(k) for a synchronization signal from a Zadoff-Chu (ZC) sequence having the odd numbered length N, the sequence P(k) having the even numbered length N–I, mapping the sequence P(k) to subcarriers so that the sequence P(k) is halved with respect to a DC subcarrier, and transmitting the a synchronization signal in the subcarriers. Time/frequency ambiguity caused by a synchronization error can be avoided, and sequence detection errors can be decreased.

10 Claims, 18 Drawing Sheets

START
DETERMINE LENGTH L OF MAPPING SECTION — S110
DETERMINE LENGTH N OF SEQUENCE — S120
ADJUST SEQUENCE ACCORDING TO L — S130
MAPPING SEQUENCE TO MAPPING SECTION — S140
END

U.S. PATENT DOCUMENTS

| | | | | |
|---|---|---|---|---|
| 7,062,002 | B1 | 6/2006 | Michel et al. | |
| 7,158,505 | B2 | 1/2007 | Dick et al. | |
| 7,443,829 | B2 | 10/2008 | Rizvi et al. | |
| 7,738,437 | B2 | 6/2010 | Ma et al. | |
| 7,746,916 | B2 | 6/2010 | Han et al. | |
| 7,808,886 | B2 | 10/2010 | McCoy | |
| 2004/0008616 | A1 | 1/2004 | Jung et al. | |
| 2004/0085946 | A1 | 5/2004 | Morita et al. | |
| 2005/0111522 | A1 | 5/2005 | Sung et al. | |
| 2006/0050799 | A1 | 3/2006 | Hou et al. | |
| 2006/0126491 | A1 | 6/2006 | Ro et al. | |
| 2007/0183306 | A1* | 8/2007 | Akita et al. | 370/208 |
| 2008/0031186 | A1 | 2/2008 | Onggosanusi et al. | |
| 2008/0080439 | A1 | 4/2008 | Aziz et al. | |
| 2008/0273522 | A1 | 11/2008 | Luo et al. | |
| 2009/0135802 | A1* | 5/2009 | Haga et al. | 370/350 |
| 2009/0219883 | A1* | 9/2009 | Cho et al. | 370/330 |

FOREIGN PATENT DOCUMENTS

| | | | |
|---|---|---|---|
| EP | 2153572 | A1 | 2/2010 |
| KR | 10-2004-0032021 | | 4/2004 |
| KR | 10-2005-0011292 | | 1/2005 |
| KR | 10-2005-0018333 | | 2/2005 |
| KR | 10-2005-0091612 | | 9/2005 |
| KR | 10-2006-0023863 | | 3/2006 |
| KR | 10-2007-0050358 | | 5/2007 |
| WO | WO 2006/129166 | | 12/2006 |
| WO | WO 2008/134722 | A1 | 11/2008 |

* cited by examiner

METHOD OF TRANSMITTING SYNCHRONIZATION SIGNAL IN WIRELESS COMMUNICATION SYSTEM

This application claims priority to International Application No. PCT/KR2008/002763, filed on May 16, 2008, which claims priority to Korean Patent Application Nos. 10-2007-0048353, filed on May 17, 2007, 10-2007-0057531, filed on Jun. 12, 2007 and 10-2007-0068364, filed on Jul. 6, 2007, all of which are incorporated by reference for all purposes as if fully set forth herein.

TECHNICAL FIELD

The present invention relates to wireless communications, and more particularly, to a method of transmitting a synchronization signal in a wireless communication system.

BACKGROUND ART

A wide code division multiple access (WCDMA) system of the 3-rd generation partnership project (3GPP) uses a total of 512 long pseudo-noise (PN) scrambling codes in order to identify base stations (BSs). As a scrambling code of a downlink channel, each BS uses a different long PN scrambling code.

When a user equipment (UE) is turned on, the UE performs system synchronization of an initial cell and acquires a long PN scrambling code identifier (ID) of the initial cell. Such a process is referred to as cell search. The initial cell is determined according to a location of the UE at a time when the UE is turned on. In general, the initial cell indicates a cell having strongest signal level which is measured by a downlink signal.

To facilitate the cell search, a WCDMA system divides 512 long PN scrambling codes into 64 code groups, and uses a downlink channel including a primary synchronization channel (P-SCH) and a secondary synchronization channel (S-SCH). The P-SCH is used to acquire slot synchronization. The S-SCH is used to acquire frame synchronization and a scrambling code group.

In general, cell search is classified into initial cell search, which is initially performed when the UE is turned on, and non-initial search which performs handover or neighbor cell measurement.

In the WCDMA system, the initial cell search is accomplished in three steps. In the first step, the UE acquires slot synchronization by using a primary synchronization signal (PSS) on the P-SCH. In the WCDMA system, a frame includes 15 slots, and each BS transmits the PSS in the frame. Herein, the same PSS is used for the 15 slots, and all BSs use the same PSS. The UE acquires the slot synchronization by using a matched filter suitable for the PSS. In the second step, a long PN scrambling code group and frame synchronization are acquired by using a secondary synchronization code (SSS) on the S-SCH. In the third step, by using a common pilot channel code correlator on the basis of the frame synchronization and the long PN scrambling code group, the UE detects a long PN scrambling code ID corresponding to a long PN scrambling code used by the initial cell. That is, since 8 long PN scrambling codes are mapped to one long PN scrambling code group, the UE computes correlation values of all of the 8 long PN scrambling codes belonging to a code group of the UE. On the basis of the computation result, the UE detects the long PN scrambling code ID of the initial cell.

Since the WCDMA system is an asynchronous system, only one PSS is used in the P-SCH. However, considering that a next generation wireless communication system has to support both synchronous and asynchronous modes, there is a need for using a plurality of PSSs.

An orthogonal frequency division multiplexing (OFDM) system capable of reducing an inter-symbol interference effect with low complexity is taken into consideration as a new system for replacing the existing WCDMA. In OFDM, data symbols, which are serially input, are converted into N parallel data symbols. Then, the data symbols are transmitted through N subcarriers. The subcarrier has orthogonality in frequency domain and experiences independent frequency selective fading. An orthogonal frequency division multiple access (OFDMA) scheme is an OFDM-based multiple access scheme.

An OFDM/OFDMA system is feasible to a synchronization error such as a frequency offset or a time offset. Moreover, since the PSS is a first detected signal in a condition whether the synchronization error exists, detection performance needs to be ensured. If the PSS detection is not achieved, synchronization is not attained, resulting in delay of network access.

Therefore, there is a need for a method capable of ensuring PSS detection performance according to radio resources allocated to the P-SCH.

DISCLOSURE OF INVENTION

Technical Problem

A method is sought for transmitting a synchronization signal robust to a synchronization error.

Technical Solution

In an aspect, a method of transmitting a synchronization signal in a wireless communication system includes generating a sequence P(k) for a synchronization signal from a Zadoff-Chu (ZC) sequence having the odd numbered length N, the sequence P(k) having the even numbered length N−1, mapping the sequence P(k) to subcarriers so that the sequence P(k) is halved with respect to a DC subcarrier, and transmitting the a synchronization signal in the subcarriers.

In another aspect, a method of transmitting a synchronization signal in a wireless communication system includes generating a sequence P(k) for a synchronization signal from a Zadoff-Chu (ZC) sequence having the length N=63 according to $$P(k) = \exp\left\{-\frac{j\pi Mk(k+1)}{63}\right\}$$

where M is a root index and k=0, 1, . . . , 30, 32, . . . , 62, whereby the length of the sequence P(k) is N−1 which is an even number, mapping the sequence P(k) to subcarriers s(n) so that the sequence P(k) is halved with respect to a DC subcarrier at which the index n is zero as shown $$s(n)=P(k)$$

where n=k−31 and k=0, 1, . . . , 30, 32, . . . , 62, and transmitting the synchronization signal on the subcarriers.

In still another aspect, a method of acquiring synchronization with a cell in a wireless communication system includes receiving a primary synchronization signal, and receiving a secondary synchronization signal. A sequence P(k) for the primary synchronization signal can be generated from a ZC sequence having the odd numbered length N. The sequence P(k) can have the even numbered length N−1 by omitting the center element of the ZC sequence and the sequence P(k) can be mapped to subcarriers so that the sequence P(k) is halved with respect to a DC subcarrier.

Advantageous Effects

Time/frequency ambiguity caused by a synchronization error can be avoided, and sequence detection errors can be decreased. In addition, a sequence having both a good peak-to-average power ratio (PAPR) and a good correlation can be obtained.

MODE FOR THE INVENTION

A wireless communication system includes a user equipment (UE) and a base station (BS). The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a node-B, a base transceiver system (BTS), an access point, etc. There are one or more cells within the coverage of the BS. Hereinafter, downlink is defined as a communication link from the BS to the UE, and uplink is defined as a communication link from the UE to BS.

There is no limit in a multiple access scheme used in the wireless communication system. The multiple access scheme may be based on a variety of multiple access schemes such as code division multiple access (CDMA), time division multiple access (TDMA), frequency division multiple access (FDMA), single-carrier FDMA (SC-FDMA), orthogonal frequency division multiple access (OFDMA), etc. For clear explanations, the following description focuses on an OFDMA-based wireless communication system.

In the wireless communication system, a sequence is widely used for various purposes such as signal detection, channel estimation, multiplexing, etc. An orthogonal sequence having a good correlation is used so that sequence detection can be easily achieved in a receiver. The orthogonal sequence may be a constant amplitude zero auto-correlation (CAZAC) sequence.

A k-th element of a Zadoff-Chu (ZC) sequence belonging to the CAZAC sequence can be expressed as below:

MathFigure 1

$$P(k) = \exp\left\{-\frac{j\pi Mk(k+1)}{N}\right\}, \text{ for } N \text{ odd} \quad \text{[Math. 1]}$$

$$P(k) = \exp\left\{-\frac{j\pi Mk^2}{N}\right\}, \text{ for } N \text{ even}$$

where N denotes a length of a root ZC sequence, and M denotes a root index which is a relatively prime to N. If N is prime, the number of root indices of the ZC sequence is N−1.

A ZC sequence P(k) has three characteristics as follows.

MathFigure 2

$$|P(k)| = 1 \quad \text{[Math. 2]}$$
$$\text{for all } k, N, M$$

MathFigure 3

$$R_{M;N}(d) = \begin{cases} 1, & \text{for } d = 0 \\ 0, & \text{for } d \neq 0 \end{cases} \quad \text{[Math. 3]}$$

MathFigure 4

$$R_{M_1M_2;N}(d) = const \text{ for all } M_1, M_2 \quad \text{[Math. 4]}$$

Equation 2 means that the ZC sequence always has a magnitude of one. Equation 3 means that auto-correlation of the ZC sequence is indicated by a Dirac-delta function. The auto-correlation is based on circular correlation. Equation 4 means that cross correlation is always constant.

Figure 1:
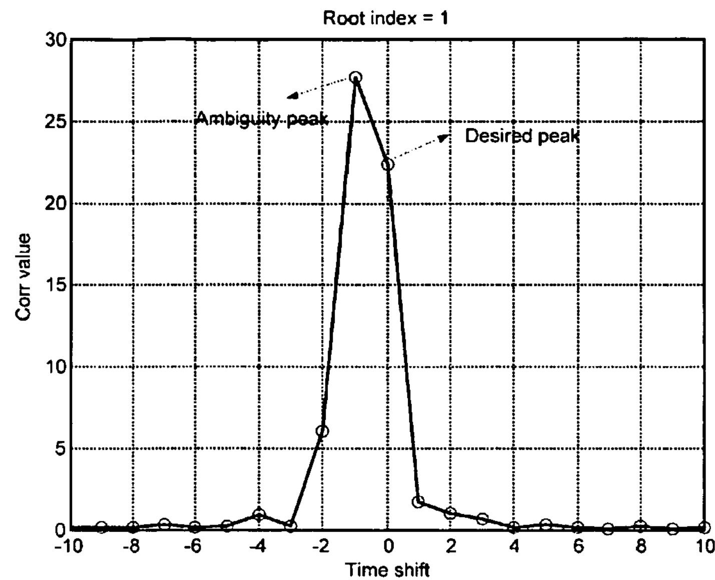
FIG. 1 is a graph showing an example of time/frequency ambiguity of a Zadoff-Chu (ZC) sequence.

FIG. 1 is a graph showing an example of time/frequency ambiguity of a ZC sequence. The time/frequency ambiguity means that, when an offset occurs in any one of time domain or frequency domain, the same offset occurs in another domain by an amount corresponding to an index of the sequence.

Referring to FIG. 1, time/frequency ambiguity is shown when a frequency offset of 5 ppm is produced by generating and transmitting a ZC sequence having a length of N=64 and having an index M=1. Herein, the frequency offset of 5 ppm corresponds to a frequency offset of 10 kHz when a carrier frequency of 2 GHz is used, which represents a 2-part partial aperiodic auto-correlation in the time domain. It is assumed herein that a channel noise does not exist.

When the frequency offset is produced, an ambiguity peak is higher than a desired peak, and thus correct timing cannot be acquired. If the sequence is correlated in the frequency domain, locations may not be correctly detected due to ambiguity when the time offset is produced.

If N=64, the number of available root sequences is 32. However, it is difficult to use all 32 sequences due to the time/frequency ambiguity.

Figure 2:
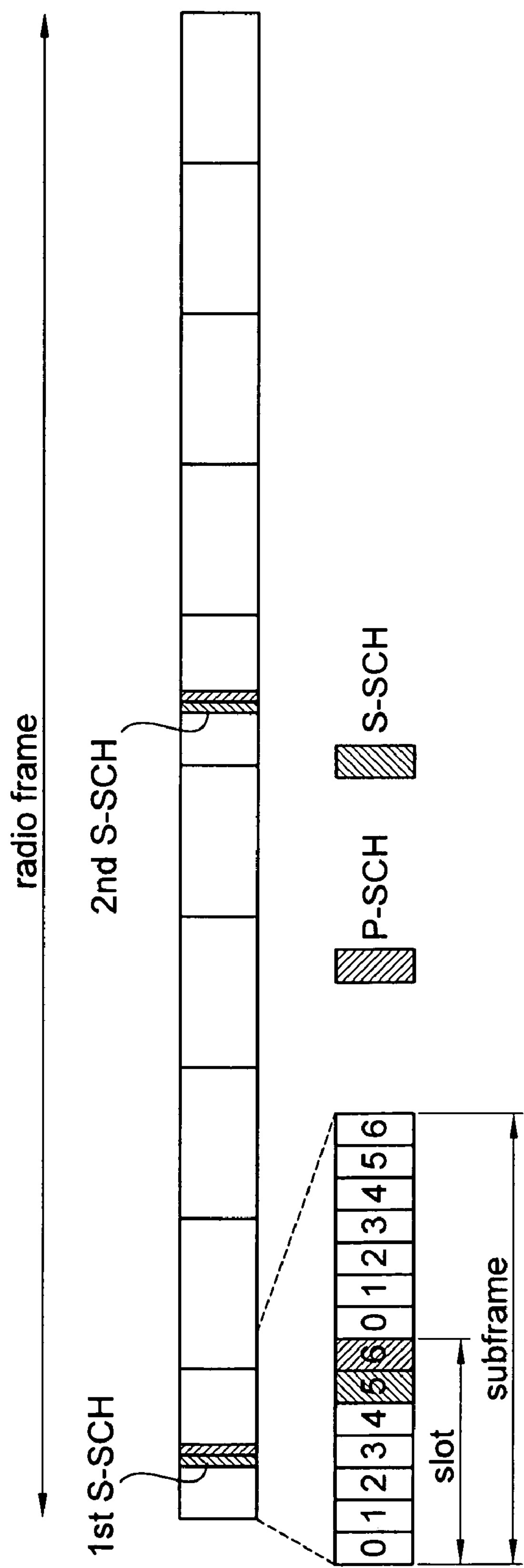
FIG. 2 shows a structure of a synchronization channel.

FIG. 2 shows a structure of a synchronization channel.

Referring to FIG. 2, a radio frame includes 10 subframes. One subframe includes two slots. One slot includes a plurality of orthogonal frequency division multiplexing (OFDM) symbols in the time domain. Although one slot includes 7 OFDM symbols in FIG. 2, the number of OFDM symbols included in one slot may vary depending on a cyclic prefix (CP) structure. The structure of the radio frame is for exemplary purposes only. Thus, the number of subframes included in the radio frame and the number of slots included in each subframe may change variously.

Primary synchronization channels (P-SCHs) are located in last OFDM symbols of a 0-th slot and a 10-th slot. The same primary synchronization signal (PSS) is used by two P-SCHs. The P-SCH is used to acquire OFDM symbol synchronization or slot synchronization. The PSS may use a Zadoff-Chu (ZC) sequence. Each of PSSs can represent a cell identity according to a root index of the ZC sequence. When three PSSs exist, a BS selects one of the three PSSs, and transmits the selected PSS by carrying the PSS on the last OFDM symbols of the 0-th slot and the 10-th slot.

Secondary synchronization channels (S-SCHs) are located in OFDM symbols positioned immediately before the last OFDM symbols of the 0-th slot and the 10-th slot. The S-SCH and the P-SCH may be located in contiguous OFDM symbols. The S-SCH is used to acquire frame synchronization. One S-SCH uses two secondary synchronization signals (SSSs). One S-SCH includes two pseudo-noise (PN) sequences (i.e., m-sequences). For example, if one S-SCH includes 64 sub-carriers, two PN sequences having a length of 31 are mapped to one S-SCH.

Locations or the number of OFDM symbols in which the P-SCH and the S-SCH are arranged over a slot are shown in FIG. 2 for exemplary purposes only, and thus may vary depending on systems.

Figure 3:
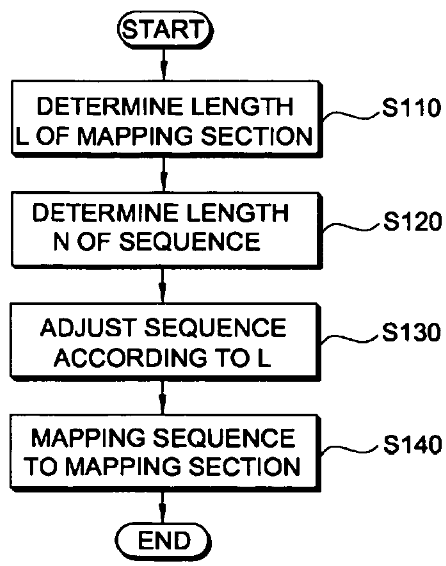
FIG. 3 is a flowchart showing a sequence allocation method according to an embodiment of the present invention.

FIG. 3 is a flowchart showing a sequence allocation method according to an embodiment of the present invention.

Referring to FIG. 3, a length L of a mapping section for mapping a sequence is determined (step S110). The mapping section may be in association with a data channel for transmitting user data or a control channel for transmitting a control signal. The mapping section may be in association with a radio resource for carrying data. The mapping section may be a specific section including a plurality of subcarriers.

A length N of the sequence is determined (step S120). The sequence length N may be less (or greater) than the length L of the mapping section. According to one embodiment, when the length L of the mapping section is even, a first odd number greater than the length L of the mapping section may be selected as the sequence length N. Alternatively, a first odd number less than the length L of the mapping section may be selected as the sequence length N. The reason of selecting the odd number is that, when an even length is used to generate the ZC sequence, a correlation and an intrinsic characteristic of the sequence are superior to those obtained when an odd length is used. According to another embodiment, a first even number greater than the length L of the mapping section may be selected as the sequence length N. Alternatively, a first even number less than the length L of the mapping section may be selected as the sequence length N. If the length L of the mapping section is odd, an even number may be selected as the sequence length N. According to still another embodiment, the sequence length N may be greater than the length L of the mapping section by 1. Alternatively, the sequence length N may be less than the length L of the mapping section by 1. As such, a sequence characteristic (or correlation characteristic) can be improved when the sequence is assigned to the mapping section while the sequence is adjusted so that the sequence length N is different from the length L of the mapping section by 1.

The sequence is adjusted to fit the length L of the mapping section (step S130). If the sequence length N is less than the length L of the mapping section, a null value (e.g., zero), an arbitrary value, a cyclic prefix, or a cyclic suffix may be inserted to a duration whose length exceeds the sequence length L. If the sequence length N is greater than the length L, an arbitrary element included in the sequence can be removed. For example, removal may be performed starting from a last portion of the sequence.

The sequence is mapped to the mapping section (step S140). If a direct current (DC) component exists in the mapping section, the DC component can be punctured. That is, the sequence is repeatedly mapped to the mapping section, and elements corresponding to the DC component are replaced with null values. Alternatively, the sequence may be mapped to the mapping section except for the DC component. The DC component represents a center frequency or a point where a frequency offset is zero in a baseband.

Although it has been exemplified that the sequence is mapped to the mapping section after adjusting the sequence length to fit the length of the mapping section, the present invention is not limited thereto. Thus, the sequence length may be adjusted to fit the length of the mapping section after the sequence is mapped to the mapping section.

In the OFDM/OFMDA system, the sequence is mapped to subcarriers in the frequency domain. When a single carrier is used in transmission, for example, when an SC-FDMA system is used, the sequence is mapped to time-domain samples. Sequences used as a pilot or ZC sequence-based control channels may be directly mapped in the frequency domain.

Figure 4:
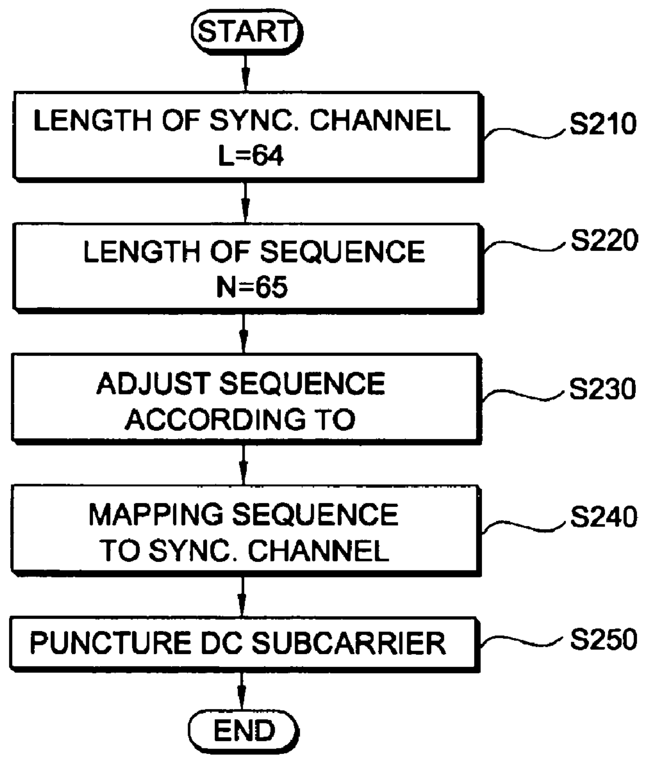
FIG. 4 is a flowchart showing a sequence allocation method according to an embodiment of the present invention.

FIG. 4 is a flowchart showing a sequence allocation method according to an embodiment of the present invention.

Referring to FIG. 4, a length of a synchronization channel is determined to L=64 when a DC subcarrier is included (step S210). The synchronization channel may be a P-SCH.

A length N of a sequence to be mapped is determined to a first odd number greater than the length L (step S220). Since L=64, it is determined to N=65.

The sequence is adjusted according to the length L of the synchronization channel (step S230). In order to adjust the sequence to fit the length L, an arbitrary element included in the sequence is removed. Herein, a last element of the sequence is removed.

The sequence is mapped to the synchronization channel (step S240). The DC subcarrier is also included in the sequence mapping. Although there is no restriction on a mapping order, continuous mapping is preferred to maintain a CAZAC characteristic. The produced sequence may be cyclic shifted in the mapping.

An element of the sequence mapped to the DC subcarrier is punctured (step S250).

Since the sequence length is determined to be greater than the length of the synchronization channel while the DC subcarrier is punctured, the CAZAC characteristic can be maintained to the maximum extent possible in the time domain of the ZC sequence inserted in the frequency domain. The ZC sequence has a duality relation in the time/frequency domains. In addition, effective correlation can be implemented by selecting root indices (e.g., M=1 and M=63) of a symmetric pair. The symmetric pair represents a sequence having a pair of root indices whose sum is equal to the length of the sequence.

The produced sequence is effective for the synchronization channel used for synchronization between the UE and the BS or used for cell search. When the sequence length is selected to be an odd number instead of a prime number, the total number of indices of the sequence may be reduced. However, in this case, the sequence length can be determined in a more flexible manner.

Figure 5:
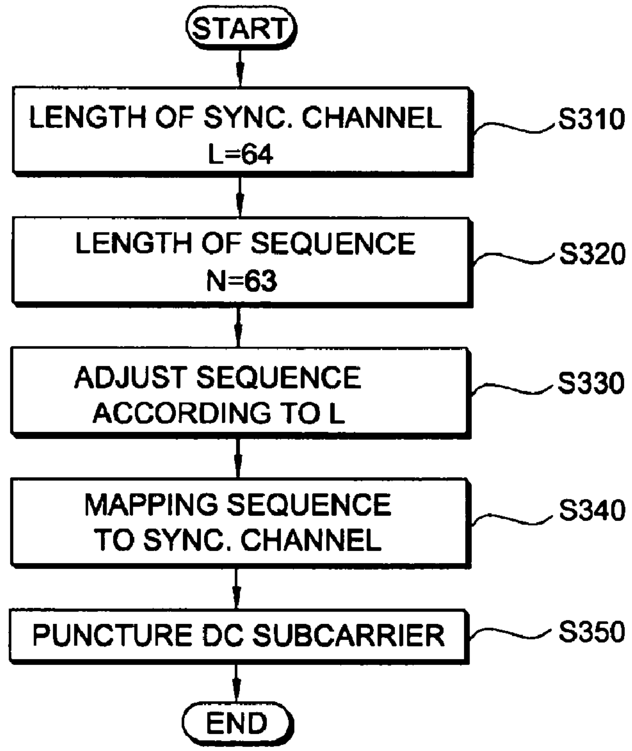
FIG. 5 is a flowchart showing a sequence allocation method according to an embodiment of the present invention.

FIG. 5 is a flowchart showing a sequence allocation method according to an embodiment of the present invention.

Referring to FIG. 5, a length of a synchronization channel is determined to L=64 when a DC subcarrier is included (step S310). The synchronization channel may be a P-SCH.

A length N of a sequence to be mapped is determined to a first odd number less than the length L (step S320). Since L=64, it is determined to N=63.

The sequence is adjusted according to the length L of the synchronization channel (step S330). In order to adjust the sequence to fit the length L, an arbitrary element is added to the sequence. The added element may be a null value, an arbitrary value, a cyclic prefix, or a cyclic suffix. The added element may be inserted after the sequence is cyclic shifted.

The sequence is mapped to the synchronization channel (step S340). The DC subcarrier is also included in the sequence mapping. Although there is no restriction on a mapping order, continuous mapping is preferred to maintain a CAZAC characteristic. The produced sequence may be cyclic shifted in the mapping.

An element of the sequence mapped to the DC subcarrier is punctured (step S350).

Although it has been exemplified that the sequence is mapped to the synchronization channel after adjusting the sequence length to fit the length of the synchronization channel, the present invention is not limited thereto. Thus, the sequence length may be adjusted to fit the length of the synchronization channel after the sequence is mapped to the synchronization channel.

Figure 6:
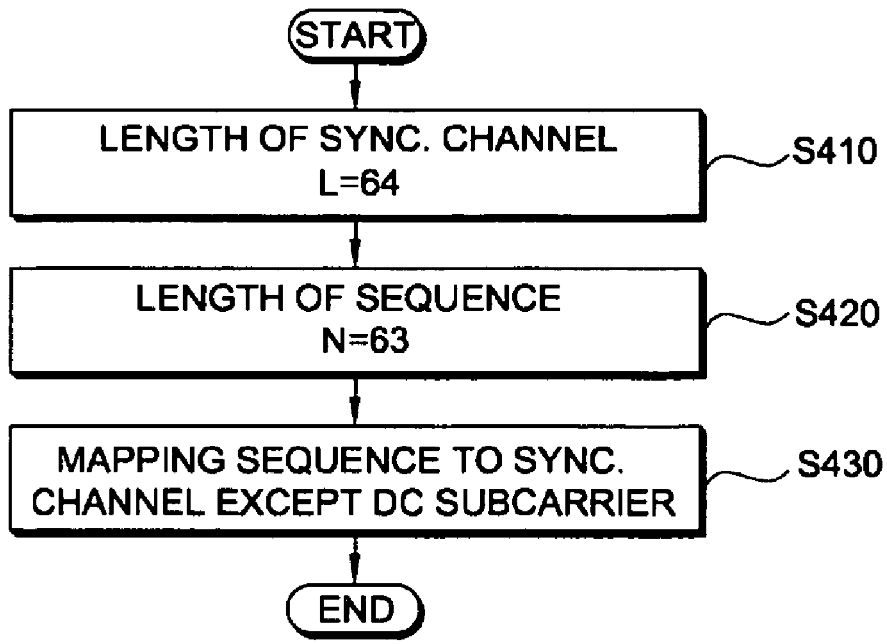
FIG. 6 is a flowchart showing a sequence allocation method according to an embodiment of the present invention.

FIG. 6 is a flowchart showing a sequence allocation method according to an embodiment of the present invention.

Referring to FIG. 6, a length of a synchronization channel is determined to L=64 when DC subcarrier is included (step S410). The synchronization channel may be a P-SCH.

A length N of a sequence to be mapped is determined to a first odd number less than the length L (step S420). Since L=64, it is determined to N=63.

The sequence is mapped to the synchronization channel except for the DC subcarrier (step S430). A null value is assigned to the DC subcarrier. In this case, a CAZAC characteristic may not be maintained due to ambiguity in the DC subcarrier.

Now, a simulation result obtained by comparing the proposed method and the conventional method will be described. It will be assumed that a synchronization channel has a length of L=64. In the conventional method, a ZC sequence having a length of N=64 is mapped to the synchronization channel without performing a specific process. In the proposed method, a ZC sequence having a length of N=65 is mapped to the synchronization channel and a DC subcarrier is punctured.

Figure 7:
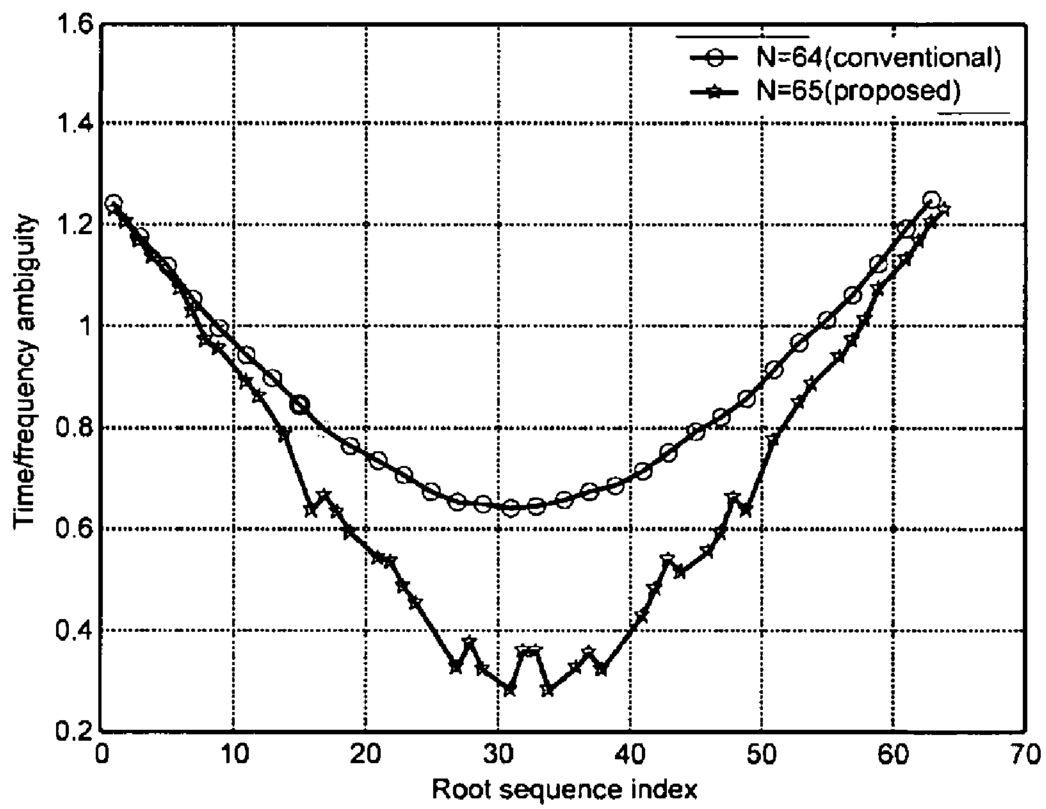
FIG. 7 is a graph for comparing sensitivity of time/frequency ambiguity.

FIG. 7 is a graph for comparing sensitivity of time/frequency ambiguity. The graph shows the sensitivity of time/frequency ambiguity in a case where a frequency offset is 5 ppm and a 2-part partial aperiodic auto-correlation is used. The sensitivity of time/frequency ambiguity is a ratio between an ambiguity peak and a desired peak. The less the sensitivity, the better the characteristic.

Referring to FIG. 7, when the proposed method is used, the sequence has a lower sensitivity than when the conventional method is used. A lowest sensitivity is about 0.65 according to the conventional method and about 0.3 according to the proposed method.

Assume that three sequences are used for a PSS. In FIG. 7, according to the conventional method, the lowest sensitivity is obtained when M=31, 33, and 29. Thus, these values are selected. According to the proposed method, the lowest sensitivity is obtained when M=34, 31, and 38. Thus, these values are selected.

Figure 8:
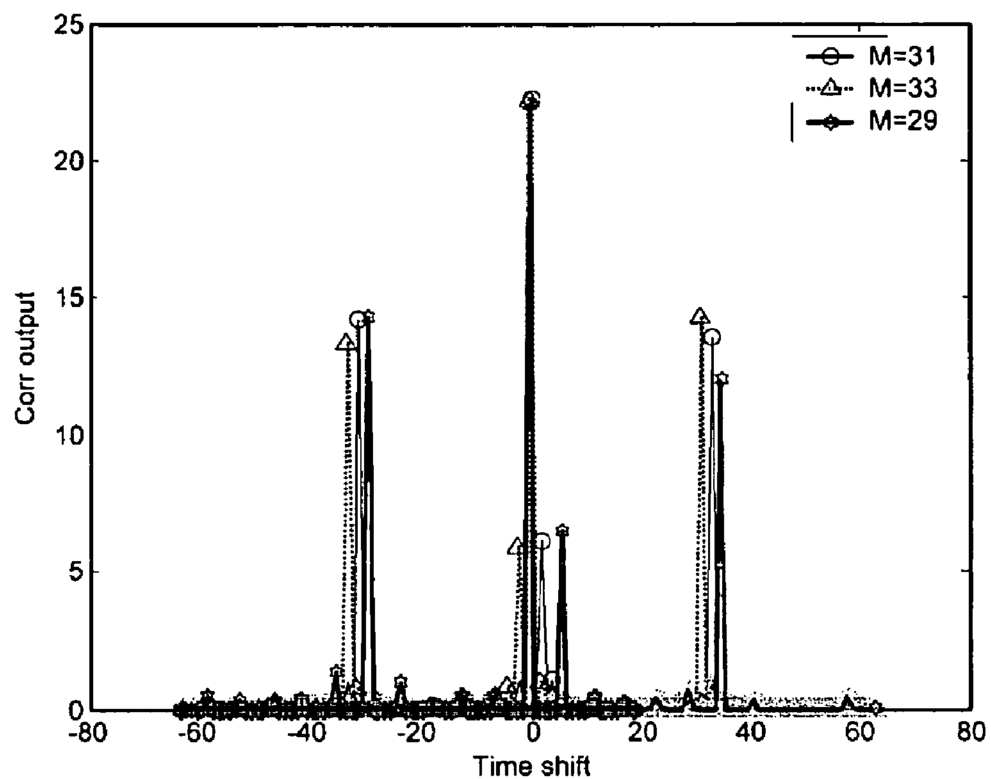
FIG. 8 is a graph showing an auto-correlation value of a sequence with respect to three indices selected according to the conventional method.
Figure 9:
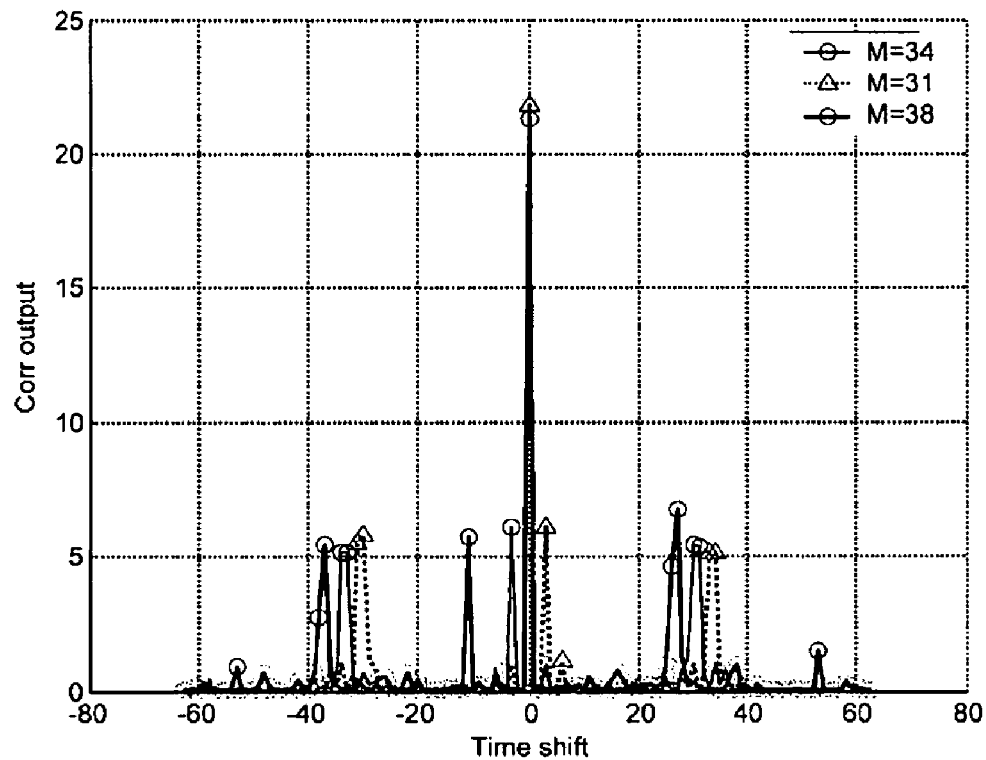
FIG. 9 is a graph showing an auto-correlation value of a sequence with respect to three indices selected according to the proposed method.

FIG. 8 is a graph showing an auto-correlation value of a sequence with respect to three indices selected according to the conventional method. FIG. 9 is a graph showing an auto-correlation value of a sequence with respect to three indices selected according to the proposed method.

Referring to FIGS. 8 and 9, second or later peaks appearing in the sequence selected according to the proposed method is relatively lower than those appearing in the sequence selected according to the conventional method, and show a significant difference from a first peak.

According to the proposed method, a possibility of finding correct timing is further increased even in a condition where a frequency offset or a time offset exists. Therefore, a better characteristic can be shown by using a sequence used in a synchronization channel for synchronization.

Figure 10:
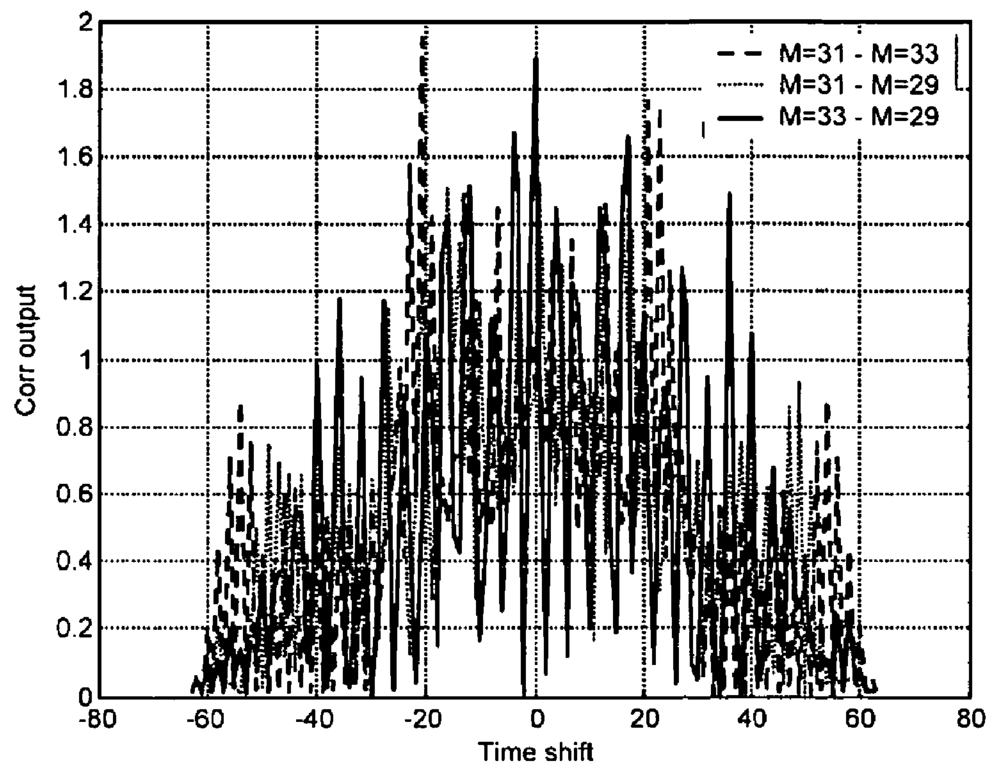
FIG. 10 is a graph showing a cross-correlation value of a sequence with respect to three indices selected according to the conventional method.
Figure 11:
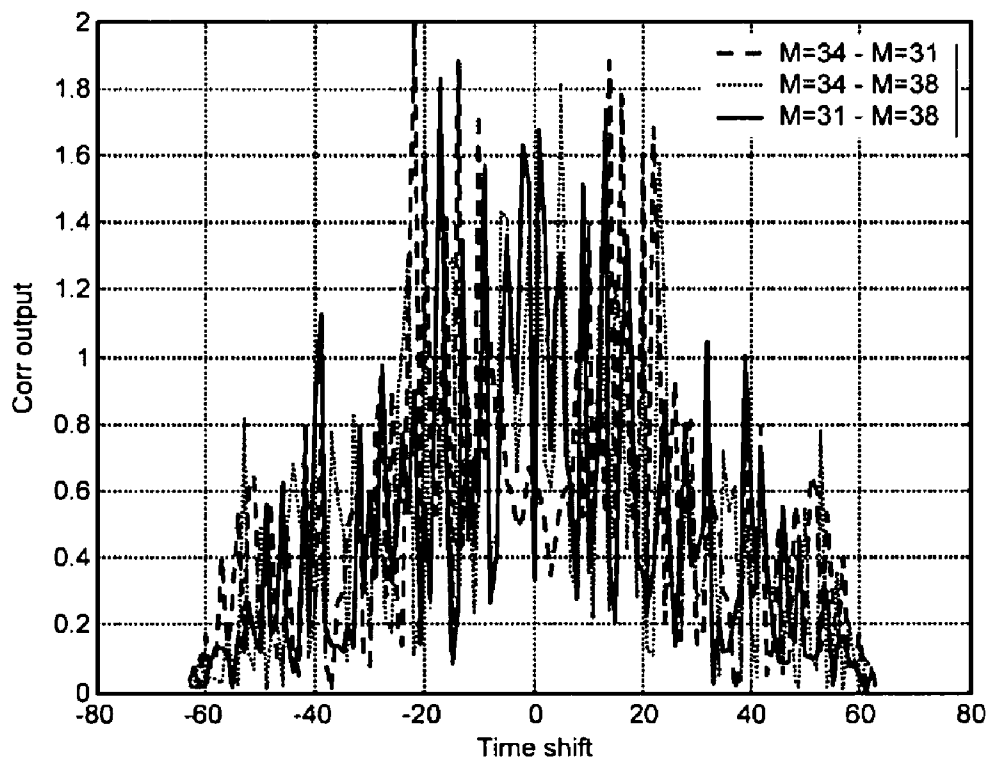
FIG. 11 is a graph showing a cross-correlation value of a sequence with respect to three indices selected according to the proposed method.

FIG. 10 is a graph showing a cross-correlation value of a sequence with respect to three indices selected according to the conventional method. FIG. 11 is a graph showing a cross-correlation value of a sequence with respect to three indices selected according to the proposed method. The cross-correlation value represents an interference level between sequences having different indices. The less the average and the dispersion, the better the performance.

Referring to FIGS. 10 and 11, according to the conventional method, the average of the cross-correlation values is about 0.522 and the dispersion thereof is 0.200. Whereas, according to the proposed method, the average is 0.503 and the dispersion is 0.195.

The proposed method can be applied not only to the synchronization channel but also to various other types of radio resources.

According to one embodiment, a resource block is taken into account. The resource block includes a plurality of subcarriers. For example, one resource block may include 12 subcarriers, and 10 resource blocks may be allocated to a mapping section. In this case, a length of the mapping section is L=120.

First, assume that a first odd number, i.e., N=121, greater than the length, i.e., L=120, of a desired mapping section is selected as a sequence length N. One arbitrary element of the sequence having a length of 121 is removed, and then the sequence is mapped to 120 subcarriers. In this case, mapping is performed irrespective of an insertion order. However, continuous mapping is preferred to maintain a CAZAC characteristic. The produced sequence may be cyclic shifted in the mapping.

Next, assume that a first odd number, i.e., N=119, less than a length, i.e., L=120, of the desired mapping section is selected as the sequence length N. A sequence having a length of 119 is produced, and one remaining subcarrier among 120 subcarriers originally intended to be used may be inserted with a null value or an arbitrary value or may be appended with a cyclic prefix or a cyclic suffix. The cyclic prefix or the cyclic suffix may be appended after cyclic shifting is performed. In addition, discontinuous mapping is also possible by inserting the null value in the middle of the sequence.

According to another embodiment, assume that one resource block includes 12 subcarriers, and two resource blocks are allocated to a mapping section. In this case, a length of the mapping section is L=24.

First, assume that a first odd number, i.e., N=25, greater than the length, i.e., L=24, of a desired mapping section is selected as a sequence length N. One arbitrary element of the sequence having a length of 25 is removed, and then the sequence is mapped to 24 subcarriers. In this case, mapping is performed irrespective of an insertion order. However, continuous mapping is preferred to maintain a CAZAC characteristic. The produced sequence may be cyclic shifted in the mapping.

Next, assume that a first odd number, i.e., N=23, less than a length, i.e., L=24, of the desired mapping section is selected as the sequence length N. A sequence having a length of 23 is produced, and one remaining subcarrier among 24 subcarriers originally intended to be used may be inserted with a null value or an arbitrary value or may be appended with a cyclic prefix or a cyclic suffix. The cyclic prefix or the cyclic suffix may be appended after cyclic shifting is performed. In addition, discontinuous mapping is also possible by inserting the null value in the middle of the sequence.

According to still another embodiment, a mapping section may have an arbitrary length. For example, the mapping section may include 780 subcarriers (i.e., L=780). First, assume that a first odd number, i.e., N=781, greater than the length, i.e., L=780, of a desired mapping section is selected as a sequence length N. One arbitrary element of the sequence having a length of 781 is removed, and then the sequence is mapped to 780 subcarriers. In this case, mapping is performed irrespective of an insertion order. However, continuous mapping is preferred to maintain a CAZAC characteristic. The produced sequence may be cyclic shifted in the mapping.

Next, assume that a first odd number, i.e., N=779, less than a length, i.e., L=780, of the desired mapping section is selected as the sequence length N. A sequence having a length of 779 is produced, and one remaining subcarrier among 780 subcarriers originally intended to be used may be inserted with a null value or an arbitrary value or may be appended with a cyclic prefix or a cyclic suffix. The cyclic prefix or the cyclic suffix may be appended after cyclic shifting is performed. In addition, discontinuous mapping is also possible by inserting the null value in the middle of the sequence.

<Sequence Mapping>

Hereinafter, a sequence mapping method will be described according to an embodiment of the present invention. For clear explanations, it will be assumed that a length of a mapping section is L=64. A ZC sequence is mapped to 64 subcarriers including a DC subcarrier.

Figure 12:
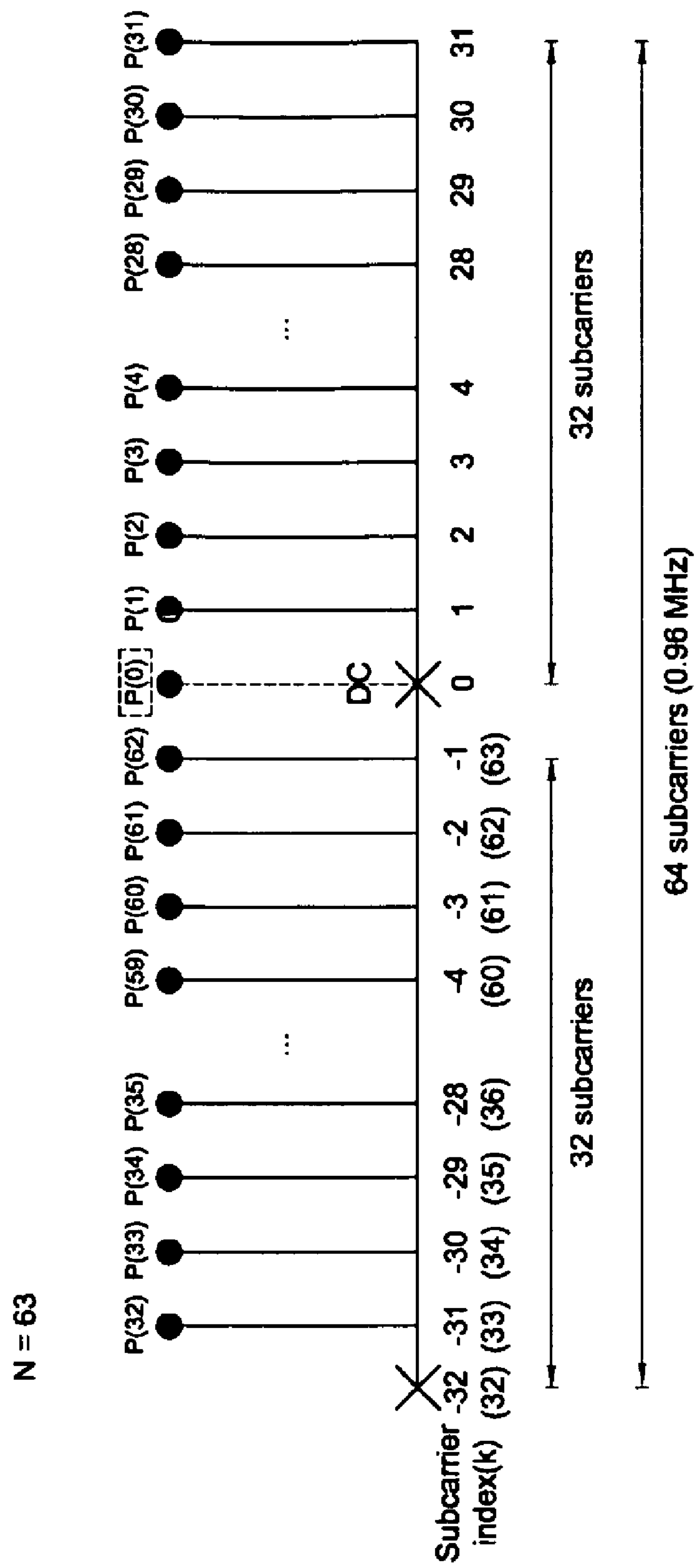
FIG. 12 shows an example of mapping a sequence having a length of N=63.

FIG. 12 shows an example of mapping a sequence having a length of N=63. Herein, a fast Fourier transform (FFT) window has a size Nf=64.

Referring to FIG. 12, a 0-th element P(0) of a ZC sequence is mapped to a DC subcarrier, and then all elements located right to the DC subcarrier are sequentially mapped to the remaining subcarriers. A subcarrier adjacent left to the DC subcarrier is mapped to a 62-th element P(62). A null value is inserted to a subcarrier (herein, a 32-th subcarrier) to which the sequence is not mapped to the mapping section. The 0-th element P(0) mapped to the DC subcarrier is punctured as indicated by a dotted line.

Herein, for convenience, one side of the DC subcarrier is defined as the left side, and the opposite side thereof is defined as the right side. However, the left side and the right side may be differently defined and thus are not limited as shown in the figure.

Figure 13:
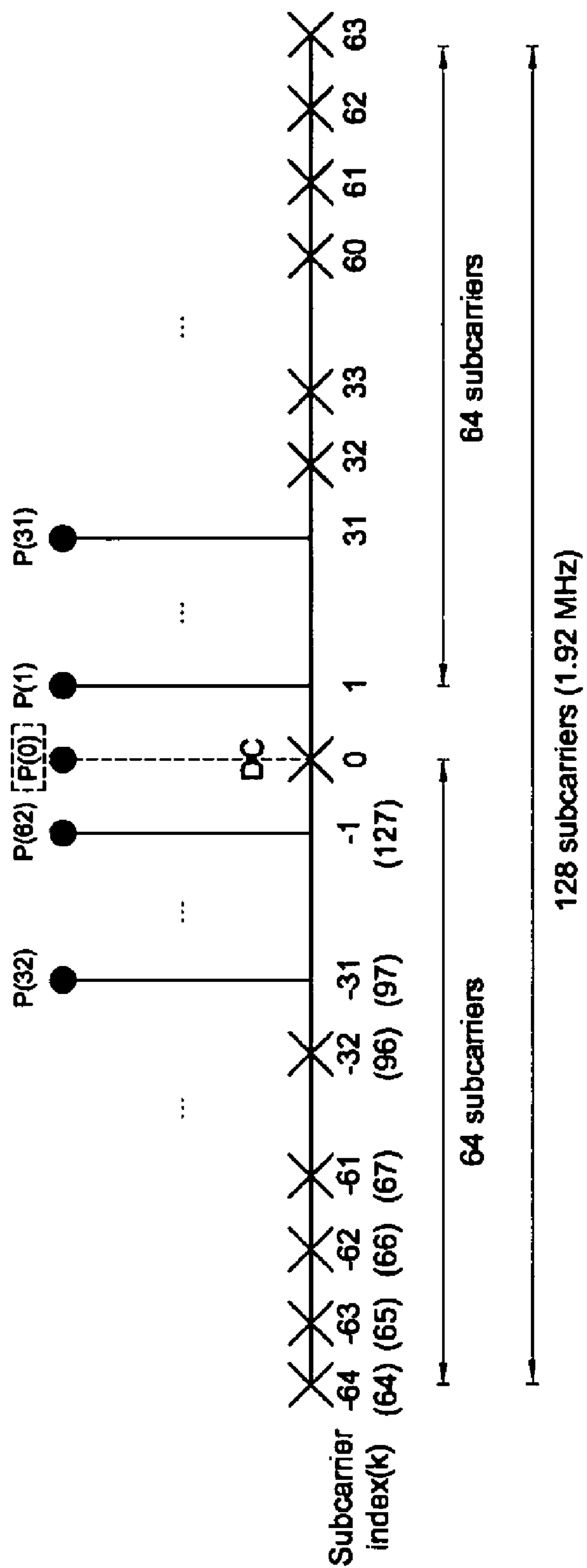
FIG. 13 shows another example of sequence mapping in comparison with FIG. 12.

FIG. 13 shows another example of sequence mapping in comparison with FIG. 12.

Referring to FIG. 13, in comparison with the example of FIG. 12, an FFT window has a size Nf=128. With a DC subcarrier being located in the center, the sequence is mapped to subcarriers in the same manner as when the FFT window size is 64, and null values are inserted to the remaining subcarriers.

Figure 14:
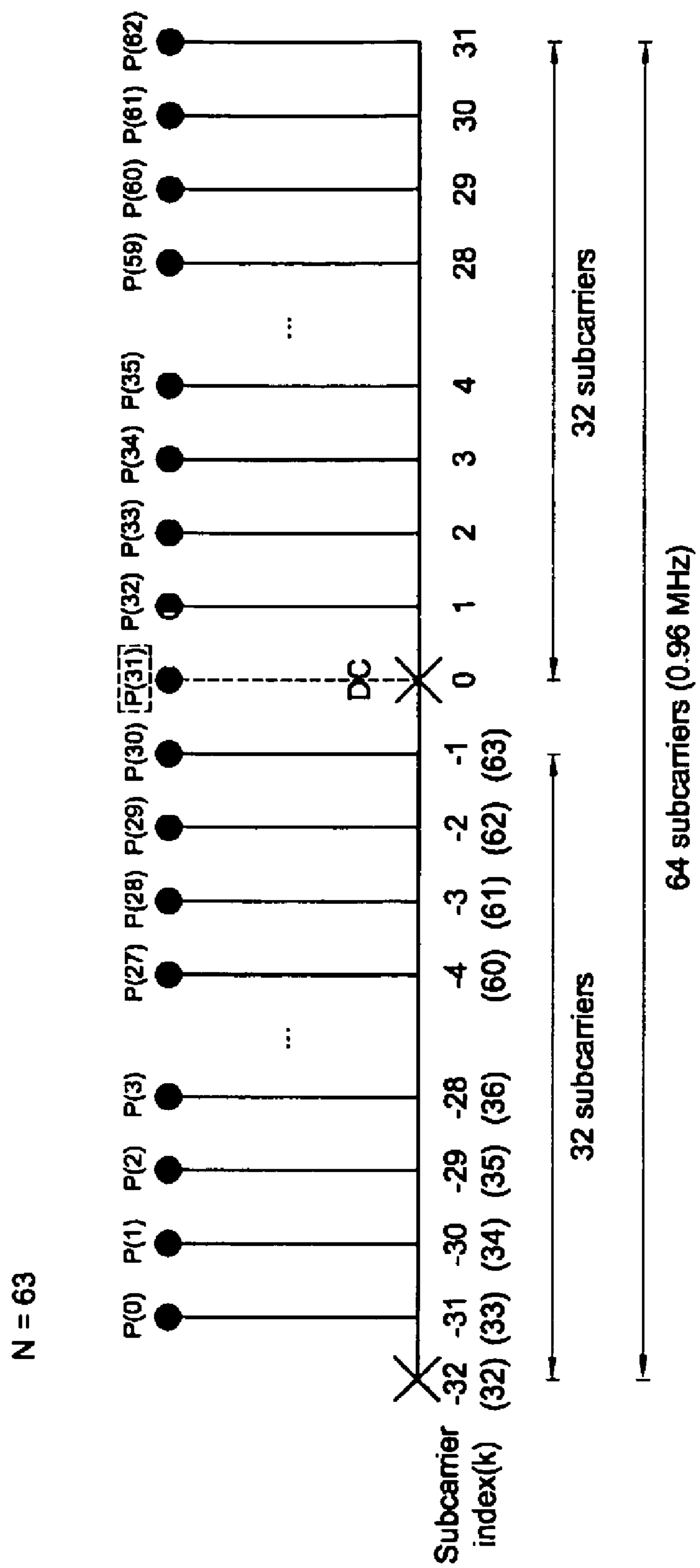
FIG. 14 shows an example of mapping a sequence having a length of N=63.

FIG. 14 shows an example of mapping a sequence having a length of N=63.

Referring to FIG. 14, a mapping section has a length L=64, and a sequence has a length N=63. A sequence P(k) is produced from a frequency-domain ZC sequence having a sequence length N=63, which is expressed as below:

MathFigure 5

$$P(k)=\exp\left\{-\frac{j\pi Mk(k+1)}{63}\right\} \qquad \text{[Math. 5]}$$

where M denotes a root index, and k=0, 1, . . . , 30, 32, . . . , 62. The reason of excluding a center element (i.e., k=31) is to remove a DC subcarrier from a mapping section s(n) and also to halve the sequence to be mapped as expressed as below:

MathFigure 6

$$s(n)=P(k) \qquad \text{[Math. 6]}$$

where n=k−31.

That is, with the DC subcarrier being located in the center, one half of the sequence is mapped to left 31 subcarriers and the other half is mapped to right 31 subcarriers. P(0) is mapped to a leftmost subcarrier a(−31). Then, the sequence is sequentially mapped except for the DC subcarrier.

A center element is omitted from a ZC sequence having an odd length to produce a sequence having an even length. The produced sequence is halved with respect to the DC subcarrier and is then mapped. Accordingly, a characteristic of the ZC sequence can be maintained in the time domain even if the ZC sequence is mapped in the frequency domain, which will be described later. A root-symmetry property and a central-symmetry property are satisfied in the time domain.

Figure 15:
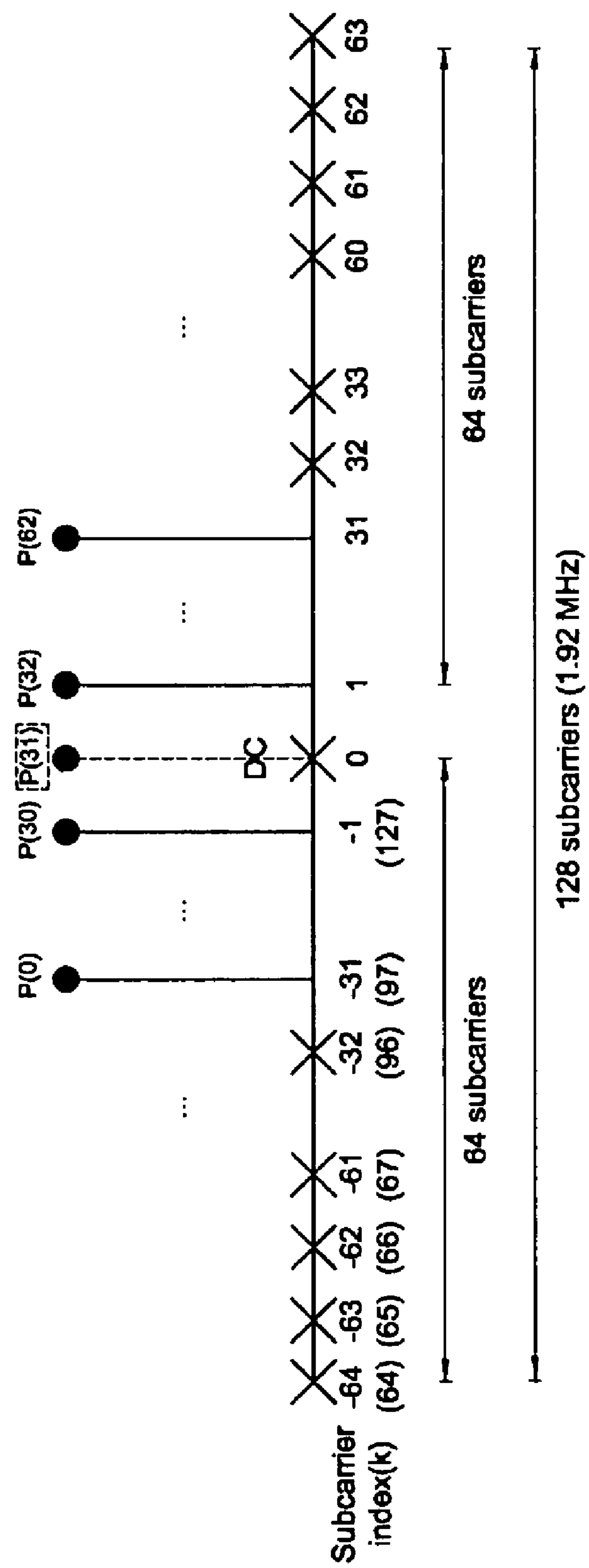
FIG. 15 shows another example of sequence mapping in comparison with FIG. 14.

FIG. 15 shows another example of sequence mapping in comparison with FIG. 14.

Referring to FIG. 15, in comparison with the example of FIG. 14, an FFT window has a size Nf=128. With a DC subcarrier being located in the center, the sequence is mapped to subcarriers in the same manner as when the FFT window size is 64, and null values are inserted to the remaining subcarriers.

Figure 16:
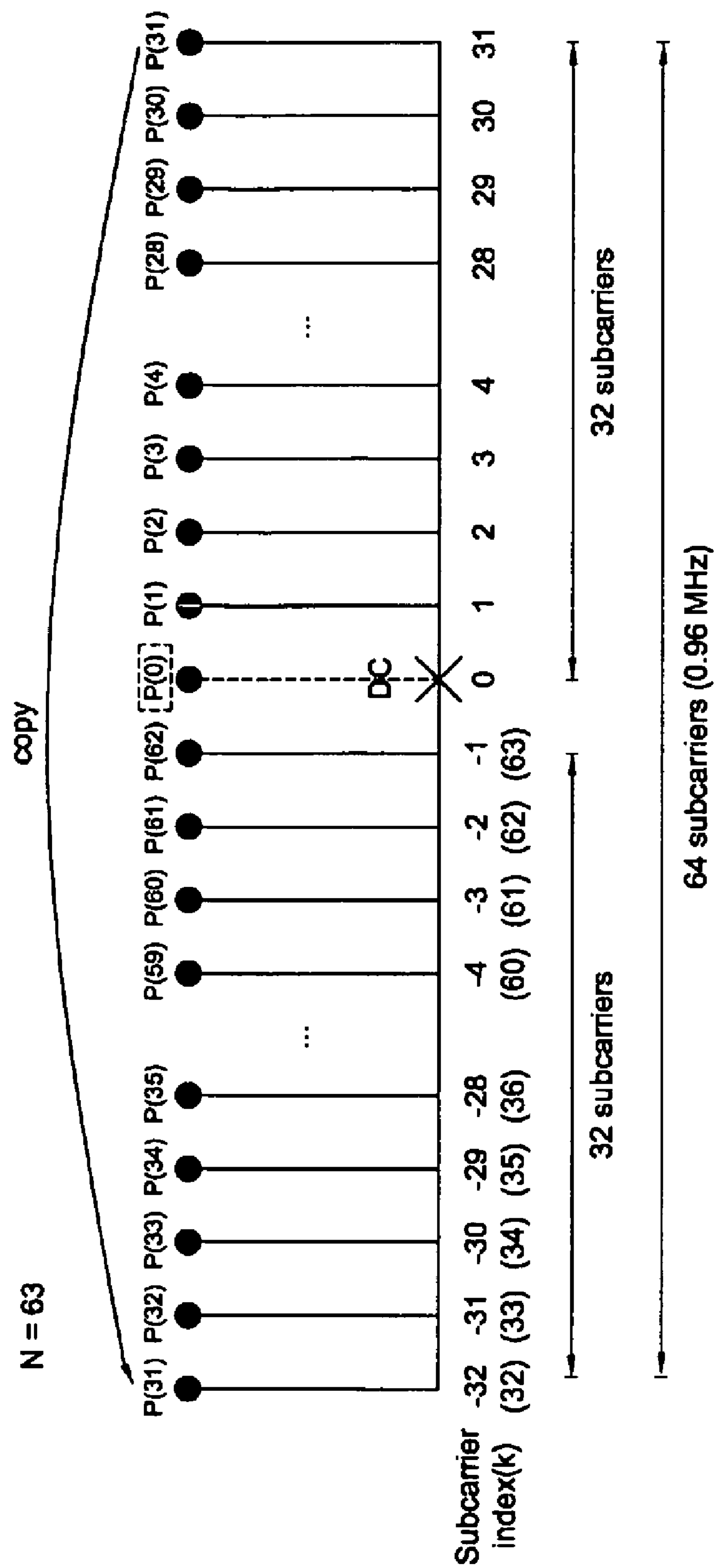
FIG. 16 shows an example of mapping a sequence having a length of N=63.

FIG. 16 shows an example of mapping a sequence having a length of N=63. Herein, an FFT window has a size Nf=64.

Referring to FIG. 16, a 0-th element P(0) of a ZC sequence is mapped to a DC subcarrier, and then all elements located right to the DC subcarrier are sequentially mapped to the remaining subcarriers. A subcarrier adjacent left to the DC subcarrier is mapped to a 62-th element P(62). Unlike the example of FIG. 12, a null value is not inserted to a subcarrier (herein, a 32-th subcarrier) to which the sequence is not mapped to the mapping section. Instead, a 31-th element P(31) is copied and inserted. That is, the sequence can be extended through cyclic extension when the mapping section is not sufficient. The 0-th element P(0) mapped to the DC subcarrier is punctured as indicated by a dotted line.

Figure 17:
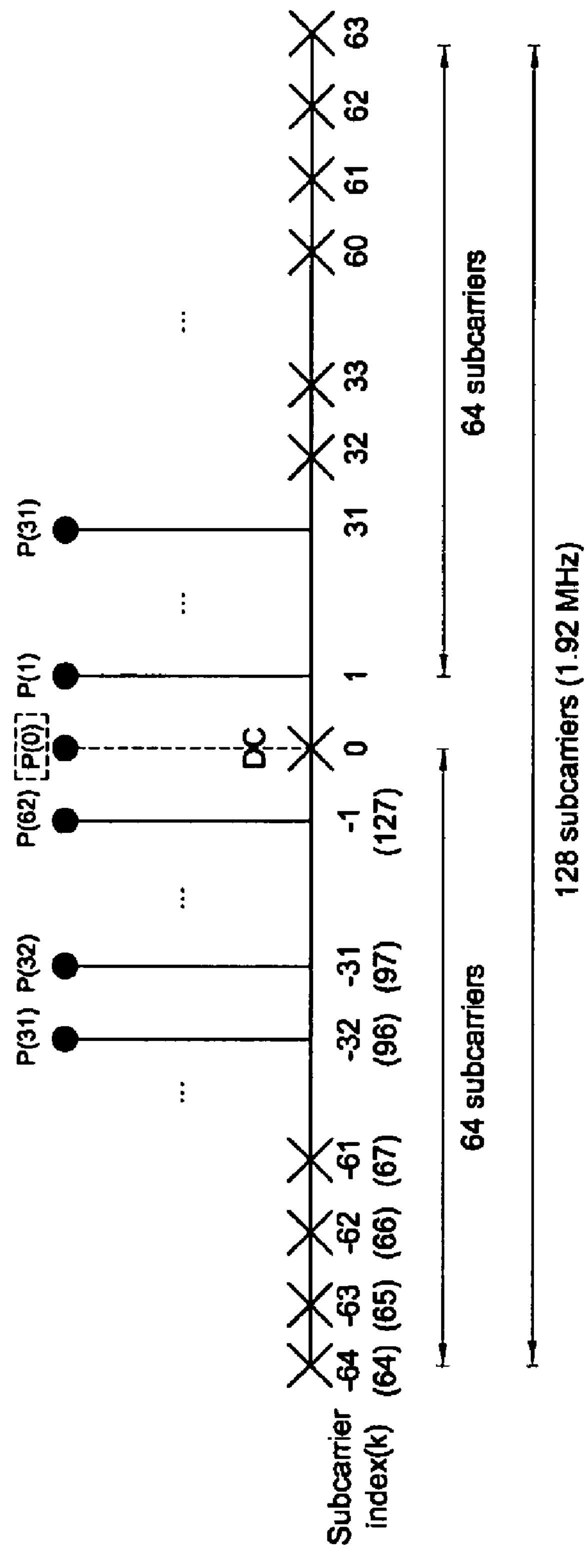
FIG. 17 shows another example of sequence mapping in comparison with FIG. 16.

FIG. 17 shows another example of sequence mapping in comparison with FIG. 16

Referring to FIG. 17, in comparison with the example of FIG. 16, an FFT window has a size Nf=128. With a DC subcarrier being located in the center, the sequence is mapped to subcarriers in the same manner as when the FFT window size is 64, and null values are inserted to the remaining subcarriers.

Figure 18:
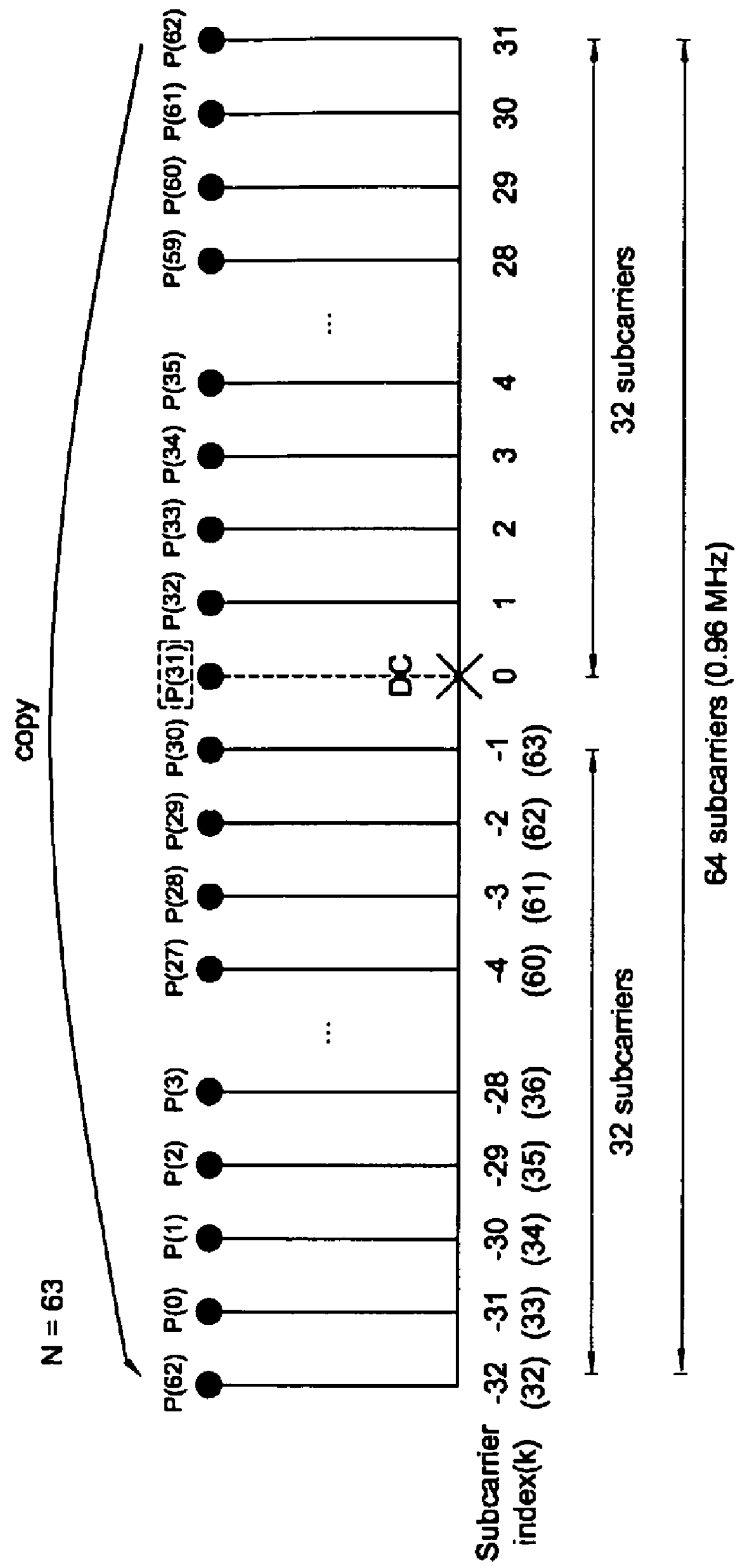
FIG. 18 shows an example of mapping a sequence having a length of N=63.

FIG. 18 shows an example of mapping a sequence having a length of N=63. Herein, an FFT window has a size Nf=64.

Referring to FIG. 18, a ZC sequence is sequentially mapped, starting from a leftmost subcarrier, so that a center element (herein, a 31-th element P(31)) of the ZC sequence is mapped to a DC subcarrier. The sequence P(31) mapped to the DC subcarrier is punctured.

A last element P(62) is copied and inserted to a subcarrier (herein, a 32-th subcarrier) to which the sequence cannot be mapped in a mapping section. That is, the sequence can be extended by cyclic extension if the mapping section is not sufficient.

Accordingly, a characteristic of the ZC sequence can be maintained in the time domain even if the ZC sequence is mapped in the frequency domain, which will be described later. The root-symmetry property and the central-symmetry property are satisfied in the time domain.

Figure 19:
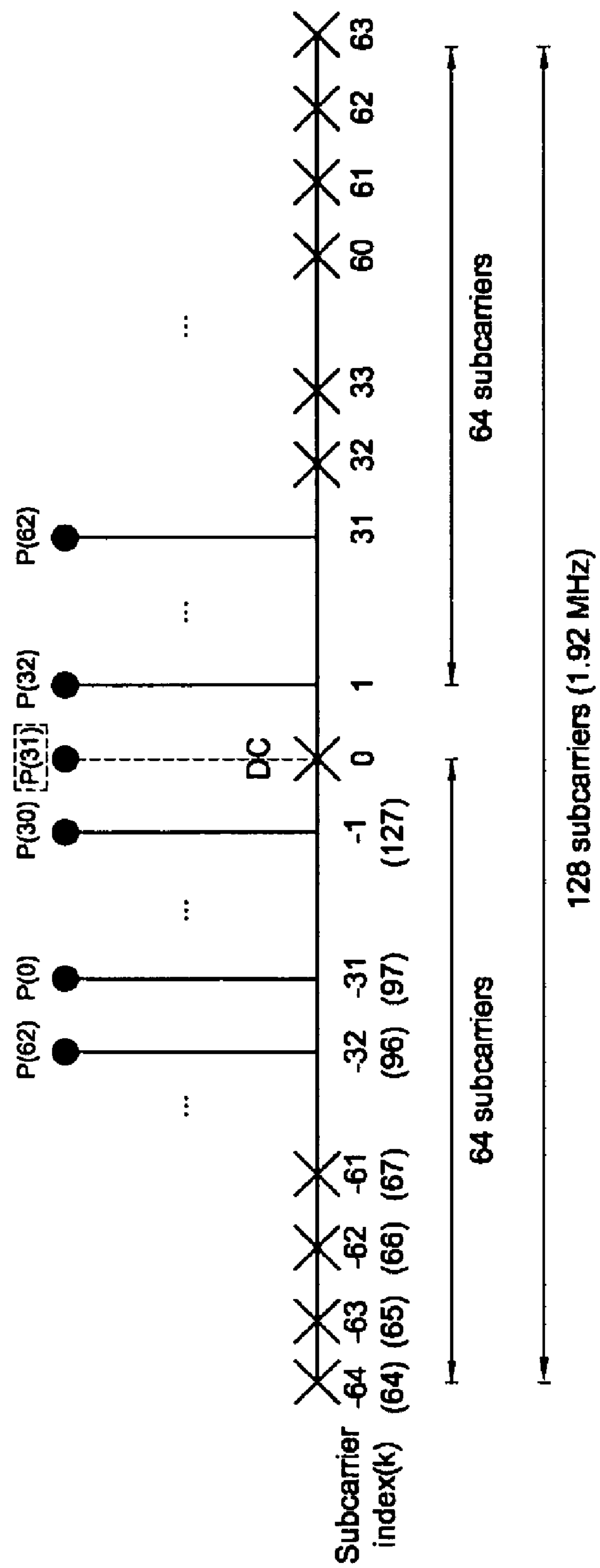
FIG. 19 shows another example of sequence mapping in comparison with FIG. 18.

FIG. 19 shows another example of sequence mapping in comparison with FIG. 18

Referring to FIG. 19, in comparison with the example of FIG. 18, an FFT window has a size Nf=128. With a DC subcarrier being located in the center, the sequence is mapped to subcarriers in the same manner as when the FFT window size is 64, and null values are inserted to the remaining subcarriers.

Figure 20:
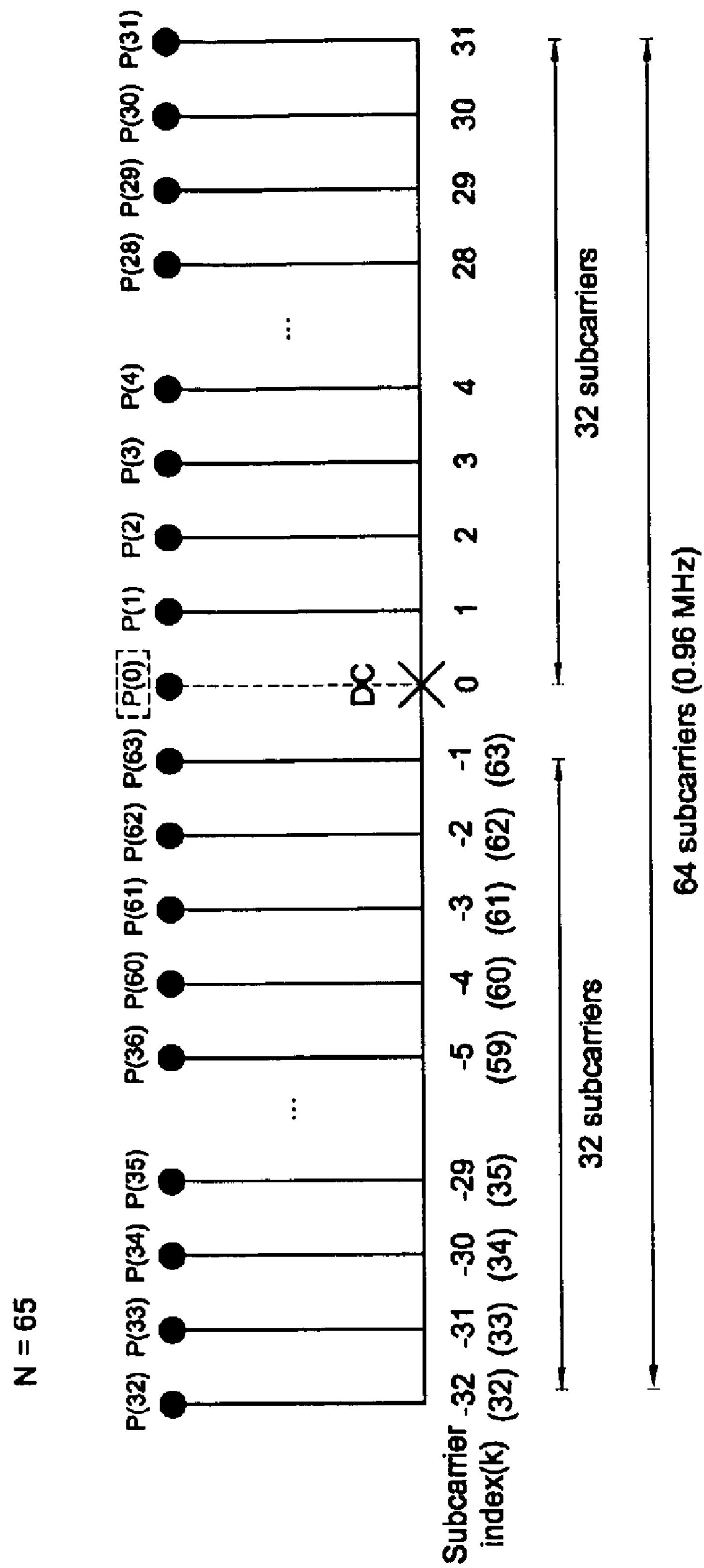
FIG. 20 shows an example of mapping a sequence having a length of N=65.

FIG. 20 shows an example of mapping a sequence having a length of N=65. Herein, an FFT window has a size Nf=64.

Referring to FIG. 20, a 0-th element P(0) of a ZC sequence is mapped to a DC subcarrier, and then all elements located right to the DC subcarrier are sequentially mapped to the remaining subcarriers. A subcarrier adjacent left to the DC subcarrier is mapped to a 63-th element P(63). A 64th element P(64) of the ZC sequence is a remaining element, and is thus truncated. The 0-th element P(0) mapped to the DC subcarrier is punctured as indicated by a dotted line.

Figure 21:
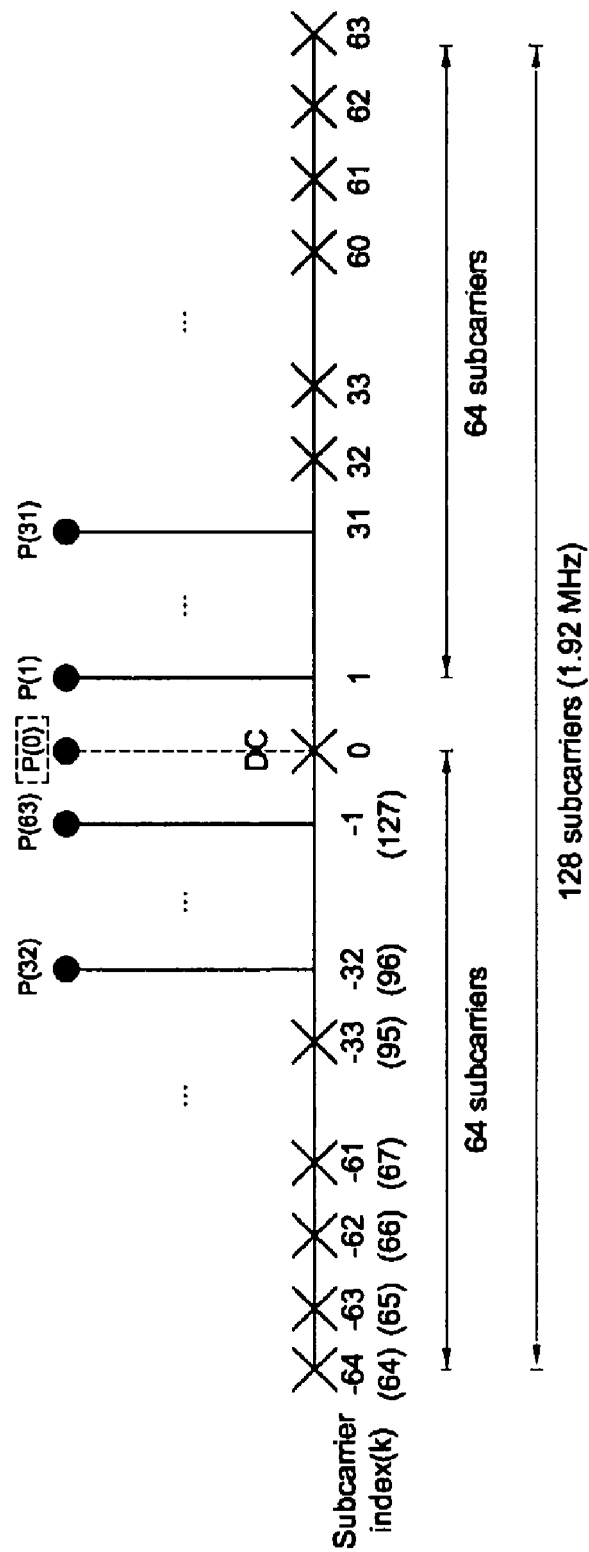
FIG. 21 shows another example of sequence mapping in comparison with FIG. 20.

FIG. 21 shows another example of sequence mapping in comparison with FIG. 20.

Referring to FIG. 21, in comparison with the example of FIG. 20, an FFT window has a size Nf=128. With a DC subcarrier being located in the center, the sequence is mapped to subcarriers in the same manner as when the FFT window size is 64, and null values are inserted to the remaining subcarriers.

Figure 22:
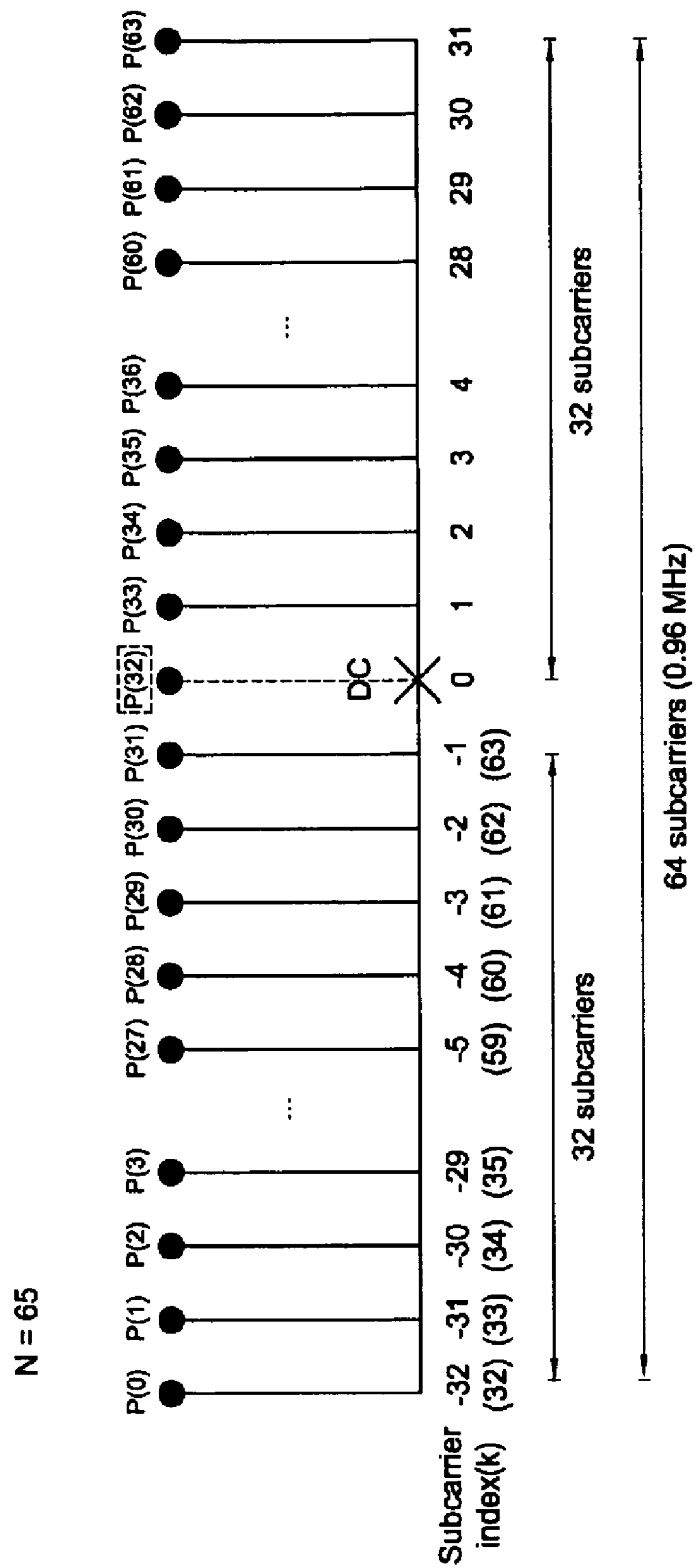
FIG. 22 shows an example of mapping a sequence having a length of N=65.

FIG. 22 shows an example of mapping a sequence having a length of N=65. Herein, an FFT window has a size Nf=64.

Referring to FIG. 22, a ZC sequence is sequentially mapped, starting from a leftmost subcarrier, so that a center element (herein, a 32-th element P(32)) of the ZC sequence is mapped to a DC subcarrier. A 64-th element P(64) of the ZC sequence is a remaining element, and is thus truncated. The sequence P(32) mapped to the DC subcarrier is punctured.

Accordingly, a characteristic of the ZC sequence can be maintained in the time domain even if the ZC sequence is mapped in the frequency domain, which will be described later. The root-symmetry property and the central-symmetry property are satisfied in the time domain.

Figure 23:
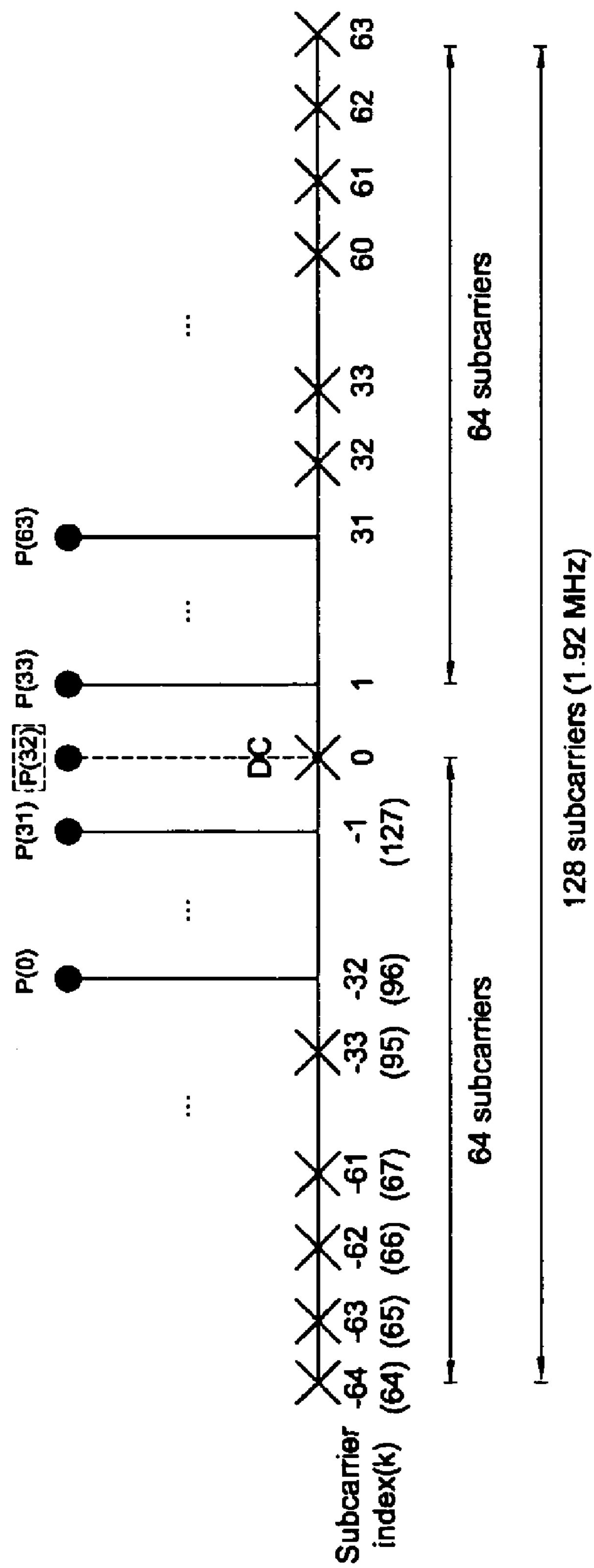
FIG. 23 shows another example of sequence mapping in comparison with FIG. 22.

FIG. 23 shows another example of sequence mapping in comparison with FIG. 22.

Referring to FIG. 23, in comparison with the example of FIG. 22, an FFT window has a size Nf=128. With a DC subcarrier being located in the center, the sequence is mapped to subcarriers in the same manner as when the FFT window size is 64, and null values are inserted to the remaining subcarriers.

<Verification on Whether Characteristic of ZC Sequence is Maintained>

As described above with reference to FIG. 14, 18, or 22, when a sequence is mapped to subcarriers such that a center element of a ZC sequence corresponds to a DC subcarrier, the root-symmetry property and the central-symmetry property are satisfied in the time domain.

The root-symmetry property means that to or more root sequences have a specific relation and thus show a specific relation with a certain root sequence index. Requirements for satisfying the root-symmetry property are shown:

MathFigure 7

$$m1+m2=(\tfrac{1}{2}\cdot N)\cdot n \text{ or } m1-m2=\pm(\tfrac{1}{2}\cdot N)\cdot n \qquad \text{[Math.7]}$$

where n=1, 2, . . . , m1 and m2 denote root sequence indices, and N denotes a sequence length.

For example, if N is odd, it means that a conjugate symmetry property appears.

When considering a root sequence $p^{m1}$ having an index m1 and another root sequence $p^{m2}$ having an index m2=N−m1, the conjugate symmetry property in both the time/frequency domains can be expressed as shown MathFigure 8

$$p^{m1}(n)=(p^{m2}(n))^* \qquad \text{[Math.8]}$$

where ( )* denotes a conjugate. For example, m1=29 and m2=34=N−m1=63−29 have the root-symmetry relation with each other.

If N is even, one root index has a special conjugate relation with the other root index For example, if indices 1, 17, 19, and 35 are selected when N=36, the root-symmetry relation can be expressed as shown below.

MathFigure 9

$$p^{m0=1}(k)=\exp\left(-j\pi\cdot 1\cdot\frac{k^2}{36}\right) \quad \text{[Math. 9]}$$

$$\begin{aligned}p^{m1=17}(k)&=\exp\left(-j\pi 17\frac{k^2}{36}\right)\\&=\exp\left(-j\pi(18-1)\frac{k^2}{36}\right)\\&=\exp\left(-j\left(\frac{\pi}{2}k^2-\frac{\pi}{36}k^2\right)\right)\\&=\begin{cases}(a_{even}^{m0=1}(k))^*, & \text{when } k \text{ is even}\\ -j\cdot(a_{odd}^{m0=1}(k))^*, & \text{otherwise}\end{cases}\end{aligned}$$

$$\begin{aligned}p^{m2=19}(k)&=\exp\left(-j\pi 19\frac{k^2}{36}\right)\\&=\exp\left(-j\pi(18+1)\frac{k^2}{36}\right)\\&=\exp\left(-j\left(\frac{\pi}{2}k^2+\frac{\pi}{36}k^2\right)\right)\\&=\begin{cases}(a_{even}^{m0=1}(k)), & \text{when } k \text{ is even}\\ -j\cdot(a_{odd}^{m0=1}(k)), & \text{otherwise}\end{cases}\end{aligned}$$

$$\begin{aligned}p^{m3=35}(k)&=\exp\left(-j\pi 35\frac{k^2}{36}\right)\\&=\exp\left(-j\pi(36-1)\frac{k^2}{36}\right)\\&=\exp\left(-j\left(\pi k^2-\frac{\pi}{36}k^2\right)\right)\\&=\begin{cases}(a_{even}^{m0=1}(k))^*, & \text{when } k \text{ is even}\\ -j\cdot(a_{odd}^{m0=1}(k))^*, & \text{otherwise}\end{cases}\end{aligned}$$

The central-symmetry property means that a signal in the time domain has a characteristic as expressed below:

MathFigure 10

$$p^m(n)=p^m(N_f-n) \quad \text{[Math.10]}$$

where $p^m(n)$ denotes an n-th element of a ZC sequence having an index m, and Nf denotes an FFT window size. When the central-symmetry property of Equation 10 is satisfied, the root-symmetry property also can be satisfied.

(1) Requirements for Satisfying Root-Symmetry Property

It will be assumed herein that a ZC sequence has an odd length when produced. In addition, a length of the ZC sequence is N and an FFT window size is Nf, where N<=Nf. First, when the ZC sequence is inserted in the frequency domain, the ZC sequence is related to a signal converted to the time domain, as described below.

A ZC sequence $P^m(k)$ having an index m in the frequency domain can be converted to the time domain according to the FFT window size Nf as expressed as below:

MathFigure 11

$$\begin{aligned}p^m(n)&=\frac{1}{N_f}\sum_{k=0}^{N_f-1}P^m(k)W^{-kn}\\&=\frac{1}{N_f}\sum_{k=0}^{N_f-1}\exp(-j\pi mk(k+1)/N)W^{-kn}\end{aligned} \quad \text{[Math. 11]}$$

where n=0, 1, 2, . . . , Nf−1, and W=exp(−2jπ/Nf). After converting the ZC sequence having an index M=N−m in the frequency domain to the time domain according to the FFT window size Nf, the ZC sequence is conjugated as expressed as below.

MathFigure 12

$$\begin{aligned}(p^{N-m}(n))^*&=\left(\frac{1}{N_f}\sum_{k=0}^{N_f-1}P^{N-m}(k)W^{-kn}\right)^*\\&=\left(\frac{1}{N_f}\sum_{k=0}^{N_f-1}\exp\left(\frac{-j\pi(N-m)}{k(k+1)/N}\right)W^{-kn}\right)^*\\&=\frac{1}{N_f}\sum_{k=0}^{N_f-1}\exp(-j\pi mk(k+1)/N)W^{-kn}\end{aligned} \quad \text{[Math. 12]}$$

In addition, Equation 13 below is satisfied.

MathFigure 13

$$\begin{aligned}(p^{N-m}(N_f-n))^*&=\left(\frac{1}{N_f}\sum_{k=0}^{N_f-1}P^{N-m}(k)W^{-k(N_f-n)}\right)^*\\&=\left(\frac{1}{N_f}\sum_{k=0}^{N_f-1}\exp\left(\frac{-j\pi(N-m)}{k(k+1)/N}\right)W^{-kn}\right)^*\\&=\frac{1}{N_f}\sum_{k=0}^{N_f-1}\exp(-j\pi mk(k+1)/N)W^{-kn}\\&=p^m(n)\end{aligned} \quad \text{[Math. 13]}$$

According to Equation 12 and Equation 13 above, a necessary and sufficient condition for satisfying the root-symmetry property in the time domain can be expressed as below.

MathFigure 14

$$p^{N-m}(n)=p^{N-m}(N_f-n) \text{ or } p^m(n)=p^m(N_f-n) \quad \text{[Math.14]}$$

Equation 14 represents the central-symmetry property.

(2) Puncture Location for Satisfying Root-Symmetry Property and Central-Symmetry Property First, a specific duration to be punctured in the frequency domain while maintaining the root-symmetry property will be described. It will be assumed herein that a signal satisfies the central-symmetry property and maintains the root-symmetry property before puncturing. In addition, it is also assumed that N<=Nf.

A value k' satisfying the above mentioned requirement can be expressed by Equation 15 below.

MathFigure 15

$$p^m(n)-\frac{1}{N_f}\exp(-j\pi mk'(k'+1)/N)\exp(j2\pi k'n/N_f)=((p^{N-m}(n))^*-\left(\frac{1}{N_f}\exp\left(\frac{-j\pi(N-m)}{k'(k'+1)/N}\right)\exp(j2\pi k'n/N_f)\right)^* \quad \text{[Math. 15]}$$

A discarded single carrier component can be expressed in the time domain as a negative term. Equation 15 can be simplified by Equation 16 below.

MathFigure 16

$$\exp(4\pi k'n/N_f)=1 \quad \text{[Math.16]}$$

Accordingly, the value k' can be expressed by Equation 17 below.

MathFigure 17

$$k' = 0, \pm\frac{N_f}{2}, \pm N_f, \ldots \quad \text{[Math. 17]}$$

When a periodical characteristic of FFT is considered, the desired value k' in a corresponding duration is k'=0, ±Nf/2. It can be seen that a puncture location depends on the FFT window size Nf if the sequence satisfies the root-symmetry property before puncturing.

(3) Verification on Root-Symmetry and Central-Symmetry for the Example of FIG. 14 or FIG. 15

In the example of FIG. 14 or FIG. 15, the ZC sequence is used in the frequency domain, and thus Equation 18 below is satisfied.

MathFigure 18

$$P^m(k)=P^m(N-k-1) \quad \text{[Math.18]}$$

When a mapping relation used in the figure is considered, an assigned sequence $D^m$ (k) can be expressed by Equation 19 below.

MathFigure 19

$$D^m(k) = \begin{cases} 0, & k=-32 \\ P^m(k+31), & k=-31, \ldots, -1 \\ 0, & k=0 \\ P^m(k+31), & k=1, \ldots, 31 \end{cases} \quad \text{[Math. 19]}$$

or $$D^m(k) = \begin{cases} 0, & k=-32 \\ P^m(N-(k+31)-1), & k=-31, \ldots, -1 \\ 0, & k=0 \\ P^m(N-(k+31)-1), & k=1, \ldots, 31 \end{cases}$$

Therefore, Equation 20 below is satisfied.

MathFigure 20

$$D^m(k)=D^m(N_f-k) \quad \text{[Math.20]}$$

A time-domain signal $d^m$(n) can be expressed by Equation 21 below.

MathFigure 21

$$d^m(n) = \frac{1}{N_f}\sum_{k=-32}^{31} D^m(k)W^{-kn} \quad \text{[Math. 21]}$$

In Equation 21, n=0, 1, 2, . . . , Nf−1, and W=exp(−2jπ/Nf).

A time-domain signal $d^m$(Nf−n) representing the central-symmetry property of Equation 10 above can be expressed by Equation 22 below.

MathFigure 22

$$\begin{aligned} d^m(N_f-n) &= \frac{1}{N_f}\sum_{k=-32}^{31} D^m(k)W^{-k(N_f-n)} \\ &= \frac{1}{N_f}\sum_{k=-32}^{31} D^m(k)W^{kn} \\ &= \frac{1}{N_f}\sum_{k=-32}^{31} D^m(N_f-k)W^{-kn} \\ &= \frac{1}{N_f}\sum_{l=N_f+32}^{N_f-31} D^m(l)W^{(N_f-l)n} \\ &= \frac{1}{N_f}\sum_{l=-31}^{32} D^m(l)W^{(N_f-l)n} \\ &= \frac{1}{N_f}\sum_{l=-31}^{32} D^m(l)W^{-1n} \\ &= d^m(n) \end{aligned} \quad \text{[Math. 22]}$$

Equation 22 above shows that the central-symmetry property is satisfied.

In addition, Equation 23 below also shows that the root-symmetry property is satisfied.

MathFigure 23

$$\begin{aligned} (d^m(N_f-n))^* &= \left(\frac{1}{N_f}\sum_{k=-32}^{31} D^{N-m}(k)W^{-kn}\right)^* \\ &= \frac{1}{N_f}\sum_{k=-32}^{31} (D^{N-m}(k))^* W^{kn} \\ &= \frac{1}{N_f}\sum_{k=-32}^{31} D^m(k)W^{kn} \\ &= \frac{1}{N_f}\sum_{k=-32}^{31} D^m(N_f-k)W^{-kn} \\ &= \frac{1}{N_f}\sum_{l=N_f+32}^{N_f-31} D^m(l)W^{(N_f-l)n} \\ &= \frac{1}{N_f}\sum_{l=-31}^{32} D^m(l)W^{-ln} \\ &= d^m(n) \end{aligned} \quad \text{[Math. 23]}$$

(4) Verification on Root-Symmetry and Central-Symmetry for the Example of FIG. 18 or FIG. 19

In the example of FIG. 18 or FIG. 19, the ZC sequence is used in the frequency domain, and thus Equation 18 above is satisfied.

When a mapping relation used in the figure is considered, an assigned sequence $D^m$(k) can be expressed by Equation 24 below.

MathFigure 24

$$D^m(k)=\begin{cases} P^m(62), & k=-32 \\ P^m(k+31), & k=-31,\ \ldots\ ,-1 \\ 0, & k=0 \\ P^m(k+31), & k=1,\ \ldots\ ,31 \end{cases} \quad \text{[Math. 24]}$$

or $$D^m(k)=\begin{cases} P^m(62), & k=-32 \\ P^m(N-(k+31)-1), & k=-31,\ \ldots\ ,-1 \\ 0, & k=0 \\ P^m(N-(k+31)-1), & k=1,\ \ldots\ ,31 \end{cases}$$

Therefore, Equation 25 below is satisfied.

MathFigure 25

$$D^m(k)=D^m(N_f-k),\ k\neq -32 \quad \text{[Math.25]}$$

A time-domain signal $d^m(n)$ can be expressed by Equation 26 below:

MathFigure 26

$$\begin{aligned} d^m(n) &= \frac{1}{N_f}\sum_{k=-32}^{31} D^m(k)W^{-kn} \\ &= \frac{1}{N_f}\left(D^m(-32)W^{-32n}+\sum_{k=-31}^{31} D^m(k)W^{-kn}\right) \\ &= \frac{1}{N_f}\left(W^{-32n}+\sum_{k=-31}^{31} D^m(k)W^{-kn}\right) \end{aligned} \quad \text{[Math. 26]}$$

where n=0, 1, 2, . . . , Nf−1, and W=exp(−2jπ/Nf).

A time-domain signal $d^m(Nf-n)$ representing the central-symmetry property of Equation 10 above can be expressed by Equation 27 below.

MathFigure 27

$$\begin{aligned} d^m(N_f-n) &= \frac{1}{N_f}\sum_{k=-32}^{31} D^m(k)W^{-k(N_f-n)} \\ &= \frac{1}{N_f}\sum_{k=-32}^{31} D^m(k)W^{kn} \\ &= \frac{1}{N_f}\left(\begin{matrix} D^m(-32)W^{-32n}+ \\ \sum_{k=-31}^{31} D^m(N_f-k)W^{-kn} \end{matrix}\right) \\ &= \frac{1}{N_f}\left(W^{-32n}+\sum_{l=N_f+31}^{N_f-31} D^m(l)W^{(N_f-l)n}\right) \\ &= \frac{1}{N_f}\left(W^{-32n}+\sum_{l=-31}^{31} D^m(l)W^{(N_f-l)n}\right) \\ &= \frac{1}{N_f}\left(W^{-32n}+\sum_{l=-31}^{31} D^m(l)W^{-ln}\right) \\ &= d^m(n) \end{aligned} \quad \text{[Math. 27]}$$

Equation 27 above shows that the central-symmetry property is satisfied.

Equation 28 below also shows that the root-symmetry property is satisfied.

MathFigure 28

$$\begin{aligned} (d^{N-m}(n))^* &= \left(\frac{1}{N_f}\sum_{k=-32}^{31} D^{N-m}(k)W^{-kn}\right)^* \\ &= \frac{1}{N_f}\sum_{k=-32}^{31} (D^{N-m}(k))^* W^{kn} \\ &= \frac{1}{N_f}\sum_{k=-32}^{31} D^m(k)W^{kn} \\ &= \frac{1}{N_f}\left(D^m(-32)W^{-32n}+\sum_{k=-31}^{31} D^m(k)W^{kn}\right) \\ &= \frac{1}{N_f}\left(\begin{matrix} D^m(-32)W^{-32n}+ \\ \sum_{k=-31}^{31} D^m(N_f-k)W^{kn} \end{matrix}\right) \\ &= \frac{1}{N_f}\left(\begin{matrix} D^m(-32)W^{-32n}+ \\ \sum_{l=N_f+31}^{N_f-31} D^m(l)W^{(N_f-l)n} \end{matrix}\right) \\ &= \frac{1}{N_f}\left(W^{-32n}+\sum_{l=-31}^{32} D^m(l)W^{-ln}\right) \\ &= d^m(n) \end{aligned} \quad \text{[Math. 28]}$$

(5) Verification on Root-Symmetry and Central-Symmetry for the Example of FIG. 22 or FIG. 23

In the example of FIG. 22 or FIG. 23, the ZC sequence is used in the frequency domain, and thus Equation 18 above is satisfied.

When a mapping relation used in the figure is considered, an assigned sequence $D^m$ (k) can be expressed by Equation 29 below.

MathFigure 29

$$D^m(k)=\begin{cases} P^m(k+32), & k=-32,\ \ldots\ ,-1 \\ 0, & k=0 \\ P^m(k+32), & k=1,\ \ldots\ ,31 \end{cases} \quad \text{[Math. 29]}$$

or $$D^m(k)=\begin{cases} P^m(N-(k+32)-1), & k=-32,\ \ldots\ ,-1 \\ 0, & k=0 \\ P^m(N-(k+32)-1), & k=1,\ \ldots\ ,31 \end{cases}$$

A last element $P^m(64)$ is discarded. Therefore, Equation 30 below is satisfied.

MathFigure 30

$$D^m(k)=D^m(N_f-k),\ k\neq -32 \quad \text{[Math.30]}$$

A time-domain signal $d^m(n)$ can be expressed by Equation 31 below:

MathFigure 31

$$\begin{aligned} d^m(n) &= \frac{1}{N_f}\sum_{k=-32}^{31} D^m(k)W^{-kn} \\ &= \frac{1}{N_f}\left(D^m(-32)W^{-32n} + \sum_{k=-31}^{31} D^m(k)W^{-kn}\right) \\ &= \frac{1}{N_f}\left(W^{-32n} + \sum_{k=-31}^{31} D^m(k)W^{-kn}\right) \end{aligned} \quad \text{[Math. 31]}$$

where n=0, 1, 2, . . . , Nf−1, and W=exp(−2jπ/Nf).

A time-domain signal $d^m(Nf-n)$ representing the central-symmetry property of Equation 10 above can be expressed by Equation 32 below.

MathFigure 32

$$\begin{aligned} d^m(N_f-n) &= \frac{1}{N_f}\sum_{k=-32}^{31} D^m(k)W^{-k(N_f-n)} \\ &= \frac{1}{N_f}\sum_{k=-32}^{31} D^m(k)W^{kn} \\ &= \frac{1}{N_f}\left(\begin{array}{c} D^m(-32)W^{-32n} + \\ \sum_{k=-31}^{31} D^m(N_f-k)W^{kn} \end{array}\right) \\ &= \frac{1}{N_f}\left(W^{-32n} + \sum_{l=N_f+31}^{N_f-31} D^m(l)W^{(N_f-l)n}\right) \\ &= \frac{1}{N_f}\left(W^{-32n} + \sum_{l=-31}^{31} D^m(l)W^{(N_f-l)n}\right) \\ &= \frac{1}{N_f}\left(W^{-32n} + \sum_{l=-31}^{31} D^m(l)W^{-ln}\right) \\ &= d^m(n) \end{aligned} \quad \text{[Math. 32]}$$

Equation 32 above shows that the central-symmetry property is satisfied.

Equation 33 below also shows that the root-symmetry property is satisfied.

MathFigure 33

$$\begin{aligned} (d^{N-m}(n))^* &= \left(\frac{1}{N_f}\sum_{k=-32}^{31} D^{N-m}(k)W^{-kn}\right)^* \\ &= \frac{1}{N_f}\sum_{k=-32}^{31} (D^{N-m}(k))^* W^{kn} \\ &= \frac{1}{N_f}\sum_{k=-32}^{31} D^m(k)W^{kn} \\ &= \frac{1}{N_f}\left(D^m(-32)W^{-32n} + \sum_{k=-31}^{31} D^m(k)W^{kn}\right) \\ &= \frac{1}{N_f}\left(\begin{array}{c} D^m(-32)W^{-32n} + \\ \sum_{k=-31}^{31} D^m(N_f-k)W^{kn} \end{array}\right) \\ &= \frac{1}{N_f}\left(\begin{array}{c} D^m(-32)W^{-32n} + \\ \sum_{l=N_f+31}^{N_f-31} D^m(l)W^{(N_f-l)n} \end{array}\right) \\ &= \frac{1}{N_f}\left(W^{-32n} + \sum_{l=-31}^{32} D^m(l)W^{-ln}\right) \\ &= d^m(n) \end{aligned} \quad \text{[Math. 33]}$$

Therefore, it can be seen that the aforementioned requirements are satisfied if additional elements $D^m(-32)$ and $D^{N-m}(-32)$ have a conjugate relation with each other, that is, $D^m(-32)=(D^{N-m}(-32))^*$.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting a synchronization signal in a wireless communication system, the method comprising:

mapping each element of a synchronization signal sequence P(k) to a corresponding subcarrier from a sequence of subcarriers s(n) as shown by:

$$s(n)=P(k)$$

where n=k−31 and k=0, 1, . . . , 30, 32, . . . , 62; and transmitting the mapped synchronization signal sequence P(k), wherein the sequence P(k) is defined by a Zadoff-Chu (ZC) sequence having a length N=63 according to $$P(k) = \exp\left\{-\frac{j\pi Mk(k+1)}{63}\right\}$$

where M is a root index which is relatively prime to N and k=0, 1, . . . , 30, 32, . . . , 62, whereby the length of the sequence P(k) is N−1.

2. The method of claim 1, wherein the synchronization signal is a primary synchronization signal by which a user equipment acquires orthogonal frequency division multiplexing (OFDM) symbol synchronization.

3. The method of claim 1, wherein the sequence P(k) is not mapped to the DC subcarrier s(0) of the sequence of subcarriers s(n).

4. The method of claim 1, wherein the synchronization signal is transmitted in the last OFDM symbol in slots 0 and 10 of a radio frame, the radio frame comprising 20 slots, a slot comprising a plurality of OFDM symbols.

5. The method of claim 1, wherein the root index M represents a cell identity.

6. A method of acquiring synchronization with a cell in a wireless communication system, the method comprising:

receiving a primary synchronization signal; and receiving a secondary synchronization signal, wherein a sequence P(k) for the primary synchronization signal is generated from a ZC sequence having the length N=63 according to $$P(k) = \exp\left\{-\frac{j\pi Mk(k+1)}{63}\right\}$$

where M is a root index which is relatively prime to N and k=0, 1, . . . , 30, 32, . . . , 62, and each element of th the sequence P(k) is mapped to a corresponding subcarrier from a sequence of subcarriers s(n) as shown by:

$$s(n)=P(k)$$

where n=k−31 and k=0, 1, . . . , 30, 32, . . . , 62.

7. The method of claim 6, wherein the sequence P(k) is not mapped to the DC subcarrier s(0) of the sequence of subcarriers s(n).

8. The method of claim 6, wherein the primary synchronization signal and the secondary synchronization signal are transmitted in consecutive OFDM symbols.

9. The method of claim 6, wherein the primary synchronization signal is used to acquire OFDM symbol synchronization and the secondary synchronization signal is used to acquire frame synchronization.

10. A user equipment for transmitting a synchronization signal in a wireless communication system, the user equipment comprising a processor configured to:

mapping each element of a synchronization signal sequence P(k) to a corresponding subcarrier from a sequence of subcarriers s(n) as shown by:

$$s(n)=P(k)$$

where n=k−31 and k=0, 1, . . . , 30, 32, . . . , 62; and transmitting the mapped synchronization signal sequence P(k), wherein the sequence P(k) is defined by a Zadoff-Chu (ZC) sequence having a length N=63 according to $$P(k) = \exp\left\{-\frac{j\pi Mk(k+1)}{63}\right\}$$

where M is a root index which is relatively prime to N and k=0, 1, . . . , 30, 32, . . . , 62, whereby the length of the sequence P(k) is N−1.

* * * * *